(12) United States Patent
Berner et al.

(10) Patent No.: US 12,703,806 B2
(45) Date of Patent: Aug. 11, 2026

(54) PRETREATMENT COMPOSITIONS BONDED TO METAL SUBSTRATES AND METHODS OF MAKING THE SAME

(71) Applicant: Novelis Inc., Atlanta, GA (US)

(72) Inventors: Michèle Edith Berner, Sion (CH); Mathilde Guèrin, Sierre (CH); Holger Frauenrath, Lausanne (CH); Reuben Yeo, Lausanne (CH); Enzo Bomal, Lausanne (CH); Piotr Mocny, Lausanne (CH); Julian Nicolas Bleich, Lausanne (CH)

(73) Assignee: Novelis Inc., Atlanta, GA (US)

( * ) Notice: Subject to any disclaimer, the term of this patent is extended or adjusted under 35 U.S.C. 154(b) by 637 days.

(21) Appl. No.: 17/998,601

(22) PCT Filed: Jun. 9, 2021

(86) PCT No.: PCT/US2021/036524

§ 371 (c)(1),
(2) Date: Nov. 11, 2022

(87) PCT Pub. No.: WO2021/252567

PCT Pub. Date: Dec. 16, 2021

(65) Prior Publication Data

US 2023/0183517 A1 Jun. 15, 2023

Related U.S. Application Data

(60) Provisional application No. 62/705,094, filed on Jun. 10, 2020.

(51) Int. Cl.

*C09D 5/08* (2006.01)
*C09D 151/00* (2006.01)
*C09D 151/10* (2006.01)

(52) U.S. Cl.

CPC .......... *C09D 151/003* (2013.01); *C09D 5/08* (2013.01); *C09D 151/10* (2013.01)

(58) Field of Classification Search

CPC ..... C09D 151/003; C09D 5/08; C09D 151/10
See application file for complete search history.

(56) References Cited

U.S. PATENT DOCUMENTS 8,541,498 B2 9/2013 Sandhu et al.
2005/0119386 A1 6/2005 Destarac et al.
(Continued)

FOREIGN PATENT DOCUMENTS

CN 102471890 A 5/2012
CN 104936626 A 9/2015
(Continued)

OTHER PUBLICATIONS

Canadian Application No. 3186706 , "Office Action", May 7, 2024, 4 pages.
(Continued)

*Primary Examiner* — Jiangtian Xu
(74) *Attorney, Agent, or Firm* — Kilpatrick Townsend & Stockton LLP

(57) ABSTRACT

Described herein are graft copolymer pretreatment compositions that impart improved corrosion resistance, enhanced adhesion performance, lubrication, improved coating performance (e.g., enhanced wettability), and/or improved weldability and/or weld durability to metals (e.g., aluminum alloys) as compared to non-pretreated metal surfaces. Also provided herein are aluminum alloys coated with the disclosed graft copolymer pretreatment compositions and methods for applying the disclosed graft copolymer pretreatment compositions to aluminum alloys.

18 Claims, 21 Drawing Sheets

(56) References Cited

U.S. PATENT DOCUMENTS

| | | | | |
|---|---|---|---|---|
| 2005/0261436 | A1* | 11/2005 | Takamura | C08L 51/06 525/242 |
| 2006/0100350 | A1* | 5/2006 | Barsotti | C09D 151/003 524/543 |
| 2012/0059111 | A1 | 3/2012 | Sandhu et al. | |
| 2016/0083610 | A1 | 3/2016 | Lin et al. | |

FOREIGN PATENT DOCUMENTS

| | | | |
|---|---|---|---|
| CN | 107405430 | A | 11/2017 |
| EP | 1328600 | B1 | 7/2003 |
| JP | H0480277 | A | 3/1992 |
| JP | 2000178761 | A | 6/2000 |
| JP | 2000219974 | A | 8/2000 |
| JP | 2003513773 | A | 4/2003 |
| JP | 2006022127 | A | 1/2006 |
| JP | 2009544847 | A | 12/2009 |
| JP | 2011012188 | A | 1/2011 |
| JP | 2017185475 | A | 10/2017 |
| WO | 2017170210 | | 10/2017 |
| WO | 2019071920 | A1 | 4/2019 |
| WO | 2019189608 | A1 | 10/2019 |

OTHER PUBLICATIONS

European Application No. 21736857.0 , "Intention to Grant", Jul. 3, 2024, 8 pages.
Japanese Application No. 2022-576031 , "Office Action", Jun. 11, 2024, 9 pages.
Chinese Application No. 202180041667.4 , "Office Action", Mar. 5, 2024, 13 pages.
European Application No. 21736857.0 , "Office Action", Apr. 17, 2024, 3 pages.
Chinese Application No. 202180041667.4, "Office Action", Jun. 26, 2023, 14 pages.
Chinese Application No. 202180041667.4, "Office Action", Nov. 30, 2023, 22 pages.
European Application No. 21736857.0, "Office Action", Nov. 3, 2023, 6 pages.
Japanese Application No. 2022-576031, "Office Action", Dec. 12, 2023, 11 pages.
Mao et al., "An Introduction to Process Environmentology", Jun. 30, 2018, pp. 420-421.
Korean Application No. 10-2023-7000206, "Office Action", Nov. 19, 2024, 11 pages.
Canadian Application No. 3186706, "Office Action", Apr. 22, 2025, 3 pages.
European Application No. 24214513.4, "Extended European Search Report", Apr. 16, 2025, 11 pages.
Dey et al., "Synthesis and Characterization of Poly (vinylphosphonic acid-co-acrylic acid) Copolymers for Application in Bone Tissue Scaffolds", Macromolecules 49.7 (2016): 2656-2662.
Macarie et al., "Poly (vinylphosphonic acid) and its derivatives", Progress in Polymer Science 35.8 (2010): 1078-1092.
PCT/US2021/036524, "International Search Report and Written Opinion", Sep. 30, 2021, 13 pages.
Zhao et al., "Recent development in phosphonic acid-based organic coatings on aluminum", Coatings 7.9 (2017): 133.
Korean Application No. 10-2023-7000206, "Office Action", Jul. 25, 2025, 6 pages.
Canadian Application No. 3186706, "Notice of Allowance", Feb. 19, 2026, 1 page.
Japanese Application No. 2022-576031, "Office Action", Dec. 16, 2025, 16 pages.
Japanese Application No. 2024-179290, "Office Action", Nov. 18, 2025, 8 pages.
Korean Application No. 10-2023-7000206, "Notice of Decision to Grant", Dec. 19, 2025, 8 pages.

* cited by examiner

PRETREATMENT COMPOSITIONS BONDED TO METAL SUBSTRATES AND METHODS OF MAKING THE SAME

CROSS-REFERENCE TO RELATED APPLICATIONS

The present application claims priority to and filing benefit of U.S. Provisional Patent Application No. 62/705,094, filed on Jun. 10, 2020, which is incorporated herein by reference in its entirety.

FIELD

The present disclosure relates to the fields of materials science, materials chemistry, surface science, metal manufacturing, aluminum alloys, and aluminum manufacturing. Compositions and methods are disclosed herein that can be employed in automotive, transportation, electronics, industrial, and other applications. The compositions and methods disclosed herein are particularly suitable for use in motor vehicles.

BACKGROUND

Aluminum alloys are often used in environments that may incur deleterious effects to the surface, or at least a portion of the surface, of the aluminum alloy. As such, the aluminum alloys may be subject to corrosion, poor bond durability, difficulty separating stacked aluminum alloy products, uneven coating, and poor weldability and/or weld durability. Many pretreatment compositions provide functionality to address a single surface-related issue. Thus, a pretreatment composition incorporating a plurality of surface functionalizations is desirable.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Described herein is a graft copolymer pretreatment composition, comprising a polymer backbone, at least one surface binding or bonding moiety (e.g., an anchor group) attached to the polymer backbone and configured to bind or bond the polymer backbone to a first surface of a metal product, at least one functional moiety attached to the polymer backbone and configured to provide at least a first surface functionalization to the first surface of the metal product, and at least one second functional moiety attached to the polymer backbone and configured to provide at least a second surface functionalization to the first surface of the metal product, wherein the at least one functional moiety and the at least one second functional moiety provide a multi-functional surface coating.

In some examples, the polymer backbone comprises an acrylic class chain polymer structure, a methacrylic class chain polymer structure, a vinyl class chain polymer structure, a diene class chain polymer structure, a vinylidene class chain polymer structure, or any combination thereof. For example, the polymer backbone can be poly(methyl methacrylate), poly(ethyl methacrylate), poly(ethyl acrylate), polyacrylonitrile, polyethylene, polypropylene, polystyrene, poly(vinyl chloride), poly(vinyl acetate), poly(vinyl alcohol), polybutadiene, polyisoprene, polychloroprene, or any combination thereof.

In certain aspects, the at least one surface binding or bonding moiety comprises a phosphonate group, a carboxyl group, a catechol group, or a trialkoxysilyl group. For example, the phosphonate group can be poly(vinyl phosphonate). Additionally, the at least one functional moiety comprises an adhesion promoter (e.g., a hydroxyl group, an amide group, a thiol group, an epoxide group, a vinyl group, a diol group, an adhesive composition, a covalent bonding group, or an ionic bonding group). In some cases, the at least one functional moiety comprises a polymer side chain that provides a lubricating function (e.g., polyethylene glycol, polytetrahydrofuran, polyisobutene, polysilicone, or any combination thereof). In some further cases, the at least one functional moiety comprises a humectant (e.g., polypropylene glycol, hexylene glycol, butylene glycol, lactic acid, sodium hexametaphosphate, glycerol, sorbitol, xylitol, maltitol, urea, or any combination thereof). In some examples, the at least one functional moiety comprises a weld promoter.

In certain cases, the at least one functional moiety comprises a corrosion inhibitor (e.g., an inorganic corrosion inhibitor, an inorganic barrier-type corrosion inhibitor, an organic corrosion inhibitor, an organic barrier-type corrosion inhibitor, or any combination thereof). For example, the inorganic corrosion inhibitor can comprise a transition metal, a transition metal salt, a rare earth metal, or a rare earth metal salt. In some cases, the transition metal comprises titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), or gold (Au) and/or a salt of Ti, V, Cr, Mn, Fe, Co, Ni, Cu, Zn, Zr, Nb, Mo, Ru, Rh, Pd, Ag, Cd, Hf, Ta, W, Re, Os, Ir, Pt, or Au. In certain examples, the rare earth metal comprises cerium (Ce), scandium (Sc), yttrium (Y), lanthanum (La), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), or lutetium (Lu) and/or a salt of Ce, Sc, Y, La, Pr, Nd, Pm, Sm, Eu, Gd, Tb, Dy, Ho, Er, Tm, Yb, or Lu. In some aspects, the corrosion inhibitor comprises an organic corrosion inhibitor, such as mercaptobenzothiazole, benzotriazole, salicylaldoxime, dithiooxamide, quinaldic acid, thioacetamide, or 8-hydroxyquinoline. In certain examples, the at least one second functional moiety comprises an adhesion promoter, a polymer side chain that provides a lubricating function, a humectant, a weld promoter, or a corrosion inhibitor.

In certain aspects, the graft copolymer pretreatment composition is crosslinked with a crosslinking agent (e.g., a zirconium salt or a zirconium complex). Optionally, the crosslinking agent is an aqueous solution of the zirconium salt or the zirconium complex.

Also described herein is a method of pretreating at least a portion of a metal surface, comprising applying the graft copolymer pretreatment composition to at least the portion of the metal surface. In some cases, applying the graft copolymer pretreatment composition comprises solution coating at least the portion of the metal surface (e.g., roll-coating, immersion coating, enrobing, spin-coating, or spray coating at least the portion of the metal surface).

Other objects and advantages will be apparent from the following detailed description of non-limiting examples and formulae.

DETAILED DESCRIPTION

Figure 1:
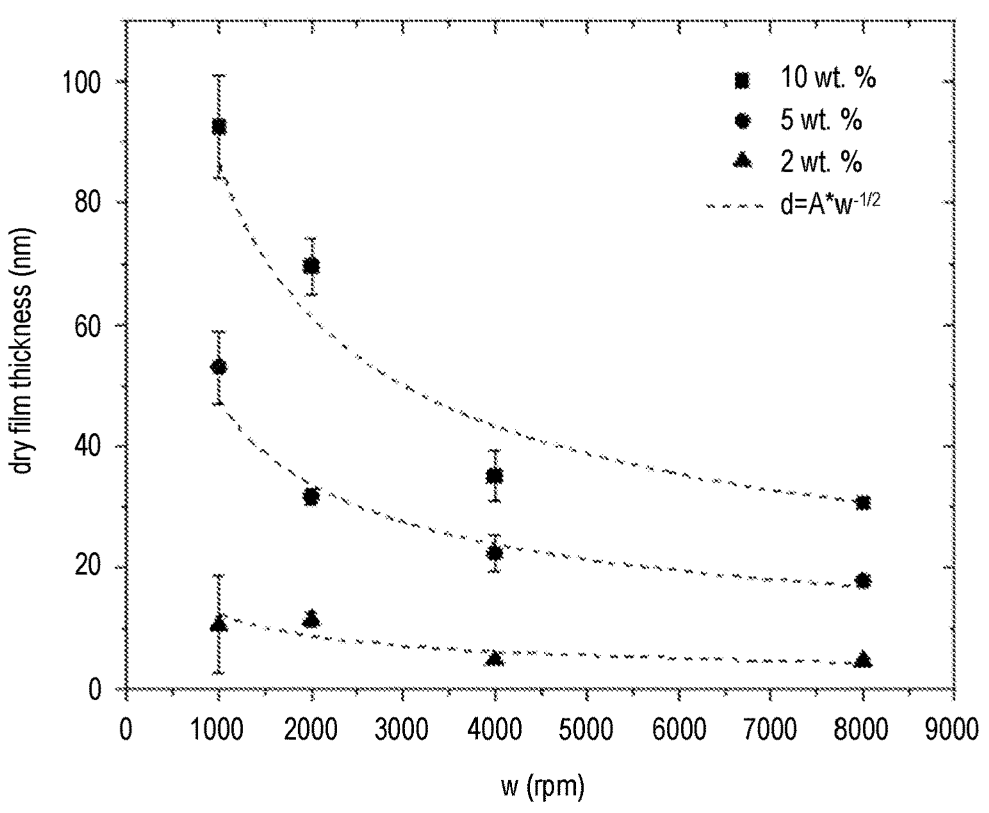
FIG. 1 is a graph showing spin-coated film thickness according to an example described herein.

Provided herein are graft copolymer pretreatment compositions that impart surface functionalization to metals, including alloys such as aluminum alloys. Also provided herein are metals (e.g., aluminum alloys) coated with the disclosed graft copolymer pretreatment compositions, along with methods for applying the disclosed graft copolymer pretreatment compositions to metals. Pretreatment, as used herein, refers to a surface modification, typically in the form of a solution or suspension that is applied to a surface and converted to a layer through physical and/or chemical reactions. The pretreatment layer is applied before the metals are subjected to processing or use (e.g., before a forming process, before placing the metals into service in an outdoor environment, or the like). The pretreatment layer imparts characteristics and performance qualities that can be significantly different from the bulk of the metal or the metal surface. For example, the graft copolymer pretreatment compositions and methods described herein provide improved corrosion resistance to metal surfaces as compared to non-pretreated metal surfaces. In addition, the disclosed coatings and methods improve the corrosion resistance of metals (e.g., aluminum and aluminum alloys) when put in service in corrosive conditions, e.g., in automotive structural parts and/or automotive body parts.

In some cases, the graft copolymer pretreatment compositions and methods described herein impart enhanced adhesion performance to the metal surfaces as compared to non-pretreated metal surfaces. In certain aspects, the graft copolymer pretreatment compositions and methods described herein provide lubrication to the metal surfaces as compared to non-pretreated metal surfaces. In some examples, the graft copolymer pretreatment compositions and methods described herein provide improved coating performance (e.g., enhanced wettability) to the alloy surfaces as compared to non-pretreated metal surfaces. In certain cases, the graft copolymer pretreatment compositions and methods described herein improve the weldability and/or weld durability of the metal surfaces as compared to non-pretreated metal surfaces. In certain aspects, the graft copolymer pretreatment compositions and methods described herein provide a multi-functional surface coating imparting at least one of lubrication, corrosion resistance, enhanced adhesion performance, improved coating performance, and/or improved weldability and/or weld durability.

Definitions and Descriptions

The terms "invention," "the invention," "this invention," and "the present invention" used herein are intended to refer broadly to all of the subject matter of this patent application and the claims below. Statements containing these terms should be understood not to limit the subject matter described herein or to limit the meaning or scope of the patent claims below.

In this description, reference is made to alloys identified by aluminum industry designations, such as "series" or "6xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, the meaning of "a," "an," or "the" includes singular and plural references unless the context clearly dictates otherwise.

As used herein, a plate generally has a thickness of greater than about 15 mm. For example, a plate may refer to an aluminum product having a thickness of greater than about 15 mm, greater than about 20 mm, greater than about 25 mm, greater than about 30 mm, greater than about 35 mm, greater than about 40 mm, greater than about 45 mm, greater than about 50 mm, greater than about 100 mm, or up to about 200 mm.

As used herein, a shate (also referred to as a sheet plate) generally has a thickness of from about 4 mm to about 15 mm. For example, a shate may have a thickness of about 4 mm, about 5 mm, about 6 mm, about 7 mm, about 8 mm, about 9 mm, about 10 mm, about 11 mm, about 12 mm, about 13 mm, about 14 mm, or about 15 mm.

As used herein, a sheet generally refers to an aluminum product having a thickness of less than about 4 mm. For example, a sheet may have a thickness of less than about 4 mm, less than about 3 mm, less than about 2 mm, less than about 1 mm, less than about 0.5 mm, less than about 0.3 mm, or less than about 0.1 mm.

Reference is made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. An O condition or temper refers to an aluminum alloy after annealing. An Hxx condition or temper, also referred to herein as an H temper, refers to a non-heat treatable aluminum alloy after cold rolling with or without thermal treatment (e.g., annealing). Suitable H tempers include Hx1, Hx2, Hx3 Hx4, Hx5, Hx6, Hx7, Hx8, or Hx9 tempers. A T1 condition or temper refers to an aluminum alloy cooled from hot working and naturally aged (e.g., at room temperature). A T2 condition or temper refers to an aluminum alloy cooled from hot working, cold worked and naturally aged. A T3 condition or temper refers to an aluminum alloy solution heat treated, cold worked, and naturally aged. A T4 condition or temper refers to an aluminum alloy solution heat treated and naturally aged. A T5 condition or temper refers to an aluminum alloy cooled from hot working and artificially aged (at elevated temperatures). A T6x condition or temper refers to an aluminum alloy solution heat treated and artificially aged. A T7 condition or temper refers to an aluminum alloy solution heat treated and artificially overaged. A T8x condition or temper refers to an aluminum alloy solution heat treated, cold worked, and artificially aged. A T9 condition or temper refers to an aluminum alloy solution heat treated, artificially aged, and cold worked. A W condition or temper refers to an aluminum alloy after solution heat treatment.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

All ranges disclosed herein are to be understood to encompass any and all endpoints with any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

As used herein, terms such as "cast metal product," "cast product," "cast aluminum alloy product," and the like are interchangeable and refer to a product produced by direct chill casting (including direct chill co-casting) or semi-continuous casting, continuous casting (including, for example, by use of a twin belt caster, a twin roll caster, a twin block caster, or any other continuous caster), electromagnetic casting, hot top casting, or any other casting method.

The term "and/or" when used in a list of two or more items, means that any one of the listed items can be employed by itself or in combination with any one or more of the listed items. For example, the expression "A and/or B" is intended to mean either or both of A and B, i.e., A alone, B alone, or A and B in combination. The expression "A, B and/or C" is intended to mean A alone, B alone, C alone, A and B in combination, A and C in combination, B and C in combination or A, B, and C in combination.

As used herein, the term "surface functionalization" refers to methods and compositions for altering the surface properties and/or characteristics of a material to achieve desired surface properties including, but not limited to, corrosion resistance, enhanced adhesion, uniform wetting, accelerated drying, any other desired surface property or characteristic, or any combination thereof.

As used herein, an acrylic class chain polymer structure is formed by polymerizing functionalized and/or unfunctionalized acrylate monomers (e.g., monomers having the structure $—CH_2═CHCOOR$) into a chain polymer; a methacrylic class chain polymer structure is formed by polymerizing functionalized and/or unfunctionalized methacrylate monomers (e.g., monomers having the structure $—CH_2═CCH_3COOR$) into a chain polymer; a vinyl class chain polymer structure is formed by polymerizing functionalized and/or unfunctionalized vinyl monomers (e.g., monomers having the structure $—CH_2═CH—R$) into a chain polymer; a diene class chain polymer structure is formed by polymerizing functionalized and/or unfunctionalized diene monomers (e.g., monomers having the structure $—CH_2═CR—CR'═CH_2$) into a chain polymer; and a vinylidene class chain polymer structure is formed by polymerizing functionalized and/or unfunctionalized vinylidene monomers (e.g., monomers having the structure $—C═CRR'$) into a chain polymer. In the above examples, R and R' are each independently selected from hydrogen, functionalized or unfunctionalized alkyl substituents, functionalized or unfunctionalized alkenyl substituents, functionalized or unfunctionalized alkynyl substituents, any suitable substituent as described herein, or any suitable polymer side chain.

As used herein, the terms alkyl, alkenyl, and alkynyl include straight- and branched-chain monovalent substituents. Examples include methyl, ethyl, isobutyl, 3-butynyl, and the like. Ranges of these groups useful with the compositions and methods described herein include $C_1$-$C_{20}$ alkyl, $C_2$-$C_{20}$ alkenyl, and $C_2$-$C_{20}$ alkynyl. Additional ranges of these groups useful with the compositions and methods described herein include $C_1$-$C_{12}$ alkyl, $C_2$-$C_{12}$ alkenyl, $C_2$-$C_{12}$ alkynyl, $C_1$-$C_6$ alkyl, $C_2$-$C_6$ alkenyl, $C_2$-$C_6$ alkynyl, $C_1$-$C_4$ alkyl, $C_2$-$C_4$ alkenyl, and $C_2$-$C_4$ alkynyl.

Heteroalkyl, heteroalkenyl, and heteroalkynyl are defined similarly as alkyl, alkenyl, and alkynyl, but can contain O), S, or N heteroatoms or combinations thereof within the backbone. Ranges of these groups useful with the compositions and methods described herein include $C_1$-$C_{20}$ heteroalkyl, $C_2$-$C_{20}$ heteroalkenyl, and $C_2$-$C_{20}$ heteroalkynyl. Additional ranges of these groups useful with the compositions and methods described herein include $C_1$-$C_{12}$ heteroalkyl, $C_2$-$C_{12}$ heteroalkenyl, $C_2$-$C_{12}$ heteroalkynyl, $C_1$-$C_6$ heteroalkyl, $C_2$-$C_6$ heteroalkenyl, $C_2$-$C_6$ heteroalkynyl, $C_1$-$C_4$ heteroalkyl, $C_2$-$C_4$ heteroalkenyl, and $C_2$-$C_4$ heteroalkynyl.

The terms cycloalkyl, cycloalkenyl, and cycloalkynyl include cyclic alkyl groups having a single cyclic ring or multiple condensed rings. Examples include cyclohexyl, cyclopentylethyl, and adamantanyl. Ranges of these groups useful with the compositions and methods described herein include $C_3$-$C_{20}$ cycloalkyl, $C_3$-$C_{20}$ cycloalkenyl, and $C_3$-$C_{20}$ cycloalkynyl. Additional ranges of these groups useful with the compositions and methods described herein include $C_5$-$C_{12}$ cycloalkyl, $C_5$-$C_{12}$ cycloalkenyl, $C_5$-$C_{12}$ cycloalkynyl, $C_5$-$C_6$ cycloalkyl, $C_5$-$C_6$ cycloalkenyl, and $C_5$-$C_6$ cycloalkynyl.

The terms heterocycloalkyl, heterocycloalkenyl, and heterocycloalkynyl are defined similarly as cycloalkyl, cycloalkenyl, and cycloalkynyl, but can contain O, S, or N heteroatoms or combinations thereof within the cyclic backbone. Ranges of these groups useful with the compositions and methods described herein include $C_3$-$C_{20}$ heterocycloalkyl, $C_3$-$C_{20}$ heterocycloalkenyl, and $C_3$-$C_{20}$ heterocycloalkynyl. Additional ranges of these groups useful with the compositions and methods described herein include $C_5$-$C_{12}$ heterocycloalkyl, $C_5$-$C_{12}$ heterocycloalkenyl, $C_5$-$C_{12}$ heterocycloalkynyl, $C_5$-$C_6$ heterocycloalkyl, $C_5$-$C_6$ heterocycloalkenyl, and $C_5$-$C_6$ heterocycloalkynyl.

The term hydroxyl as used herein is represented by the formula-OH.

Aryl molecules include, for example, cyclic hydrocarbons that incorporate one or more planar sets of, typically, six carbon atoms that are connected by delocalized electrons numbering the same as if they consisted of alternating single and double covalent bonds. An example of an aryl molecule is benzene. Heteroaryl molecules include substitutions along their main cyclic chain of atoms such as O, N, or S. Examples of heteroaryl molecules include furan, pyrrole, thiophene, imidazole, oxazole, pyridine, and pyrazine. Aryl and heteroaryl molecules can also include additional fused rings, for example, benzofuran, indole, benzothiophene, naphthalene, anthracene, and quinoline. The aryl and heteroaryl molecules can be attached at any position on the ring, unless otherwise noted.

The term alkoxy as used herein is an alkyl group attached to the remainder of the molecule via an oxygen atom. The term aryloxy as used herein is an aryl group attached to the remainder of the molecule via an oxygen atom. Likewise, the terms alkenyloxy, alkynyloxy, heteroalkyloxy, heteroalkenyloxy, heteroalkynyloxy, heteroaryloxy, cycloalkyloxy, and heterocycloalkyloxy as used herein are an alkenyloxy, alkynyloxy, heteroalkyloxy, heteroalkenyloxy, heteroalkynyloxy, heteroaryloxy, cycloalkyloxy, and heterocycloalkyloxy group, respectively, attached to the remainder of the molecule via an oxygen atom.

The alkoxy, aryloxy, amino, alkyl, alkenyl, alkynyl, aryl, heteroalkyl, heteroalkenyl, heteroalkynyl, heteroaryl, cycloalkyl, or heterocycloalkyl molecules used herein can be substituted or unsubstituted. As used herein, the term substituted includes the addition of an alkoxy, aryloxy, amino, alkyl, alkenyl, alkynyl, aryl, heteroalkyl, heteroalkenyl, heteroalkynyl, heteroaryl, cycloalkyl, or heterocycloalkyl group to a position attached to the main chain of the alkoxy, aryloxy, amino, alkyl, alkenyl, alkynyl, aryl, heteroalkyl, heteroalkenyl, heteroalkynyl, heteroaryl, cycloalkyl, or heterocycloalkyl, e.g., the replacement of a hydrogen by one of these molecules. Examples of substitution groups include, but are not limited to, hydroxy, halide (e.g., fluoride, chloride, bromide, or iodide), and carboxyl groups. Conversely, as used herein, the term unsubstituted indicates the alkoxy, aryloxy, amino, alkyl, alkenyl, alkynyl, aryl, heteroalkyl, heteroalkenyl, heteroalkynyl, heteroaryl, cycloalkyl, or heterocycloalkyl has a full complement of hydrogens, i.e., commensurate with its saturation level, with no substitutions, e.g., linear decane ($-(CH_2)_9-CH_3$).

The structures depicted herein include all enantiomeric, diastereomeric, and geometric (or conformational) forms of the structure; for example, the R and S configurations for each asymmetric center, cis and trans isomers, (Z) and (E) double bond isomers, and (Z) and (E) conformational isomers.

As used herein, the term polymer is inclusive of homopolymers and copolymers. Homopolymer refers to a polymer derived from a single polymerizable monomer. Copolymer refers to a polymer derived from two or more polymerizable monomers.

As used herein, a crosslinked polymer is defined by the presence of inter-chain links connecting two or more individual polymer chains. A crosslinked polymer can be permanently or temporarily crosslinked.

As used herein, a polymer gel is a substantially diluted crosslinked polymer A polymer gel can be formed during the polymerization of polymerizable monomers in the presence of a solvent, by adding a crosslinking agent or a small fraction of a bi- (or multi-) functional monomer. Alternatively, crosslinking can be achieved in a subsequent step applying a crosslinking agent to a suitable polymer incorporating crosslinkable functionalities. The latter can be achieved after further processing of the non-crosslinked polymer, including application as thin films on metal surfaces.

As used herein, a crosslinking agent can connect two or more individual chains by reacting with suitable functionalities in the polymer.

Pretreatment Compositions:

Described herein are graft copolymer pretreatment compositions that, in some examples, are bonded to at least a portion of a surface of a metal product, including a metal alloy product, for example, an aluminum alloy product. While aluminum alloy products are described throughout the text, the methods and products apply to any metal. In some examples, the metal product may be aluminum, an aluminum alloy, magnesium, a magnesium-based material, titanium, a titanium-based material, copper, a copper-based material, steel, a steel-based material, bronze, a bronze-based material, brass, a brass-based material, a composite, a sheet used in composites, or any other suitable metal or combination of materials. The metal product may include monolithic materials, as well as non-monolithic materials such as roll-bonded materials, clad materials, composite materials, or various other materials. In some examples, the metal product is a metal coil, a metal strip, a metal plate, a metal sheet, a metal billet, a metal ingot, or the like.

In some non-limiting examples, the graft copolymer pretreatment compositions described herein include a polymer backbone, a pendant moiety that can bind or bond the graft copolymer pretreatment composition to a metal surface (i.e., the surface binding or bonding moiety), and at least one functional pendant moiety that can impart a functional pretreatment characteristic to the metal surface (i.e., a functional moiety).

Polymer Backbone

In some cases, the polymer backbone is an acrylic class chain polymer structure, a methacrylic class chain polymer structure, a vinyl class chain polymer structure, a diene class chain polymer structure, a vinylidene class chain polymer structure, or any combination thereof. For example, the polymer backbone can be poly(methacrylic acid), poly(methyl methacrylate), poly(ethyl methacrylate), poly(acrylic acid), poly(methyl acrylate), poly(ethyl acrylate), poly(butyl acrylate), polyacrylonitrile, polyethylene, polypropylene, polystyrene, poly(vinyl chloride), poly(vinyl acetate), poly (vinyl alcohol), polybutadiene, polyisoprene, polychloroprene, or any combination thereof.

In some cases, the chain polymer structure can be prepared from a vinyl-containing monomer to form a backbone according to Formula I below:

Formulla I

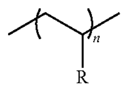

In Formula I, n is in a range of from 10 to 1000 (e.g., from 15 to 750, from 20 to 700, from 25 to 650, from 50 to 600, from 100 to 500, or from 200 to 400). Also in Formula I, R includes a functional moiety that can impart a functional pretreatment characteristic to the metal surface (e.g., the functional moiety can be a corrosion inhibitor, an adhesion promoter, a polymer side chain that provides a lubricating function (i.e., a lubricant and/or a lubricant functional moiety), a humectant, and/or a weld promoter as described below). Optionally, the functional moiety can include an ethylene oxide group, a phosphonic acid group, a hydroxyethyl group, a 2-methacryloyloxyethyl group, a 2,2,2-trifluoroethyl group, or a butyl group. Further functional groups that can be used in the graft copolymer pretreatment compositions are detailed below. In some cases, the functional moiety is attached to the backbone through a linker group, such as a substituted or unsubstituted alkyl, a substituted or unsubstituted alkenyl, or a substituted or unsubstituted carbonyl (e.g., a substituted or unsubstituted carboxyl).

In some cases, the chain polymer structure can be prepared from a diene-containing monomer to form a backbone according to Formula II below:

Formulla II

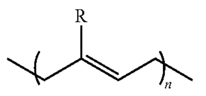

In Formula II, n is in a range of from 10 to 1000 (e.g., from 15 to 750, from 20 to 700, from 25 to 650, from 50 to 600, from 100 to 500, or from 200 to 400). Also in Formula II, R includes a functional moiety that can impart a functional pretreatment characteristic to the metal surface (e.g., the functional moiety can be a corrosion inhibitor, an adhesion promoter, a lubricant, a humectant, and/or a weld promoter as described below). Optionally, the functional moiety can include an ethylene oxide group, a phosphonic acid group, a hydroxyethyl group, a 2-methacryloyloxyethyl group, a 2,2,2-trifluoroethyl group, or a butyl group. Further functional groups that can be used in the graft copolymer pretreatment compositions are detailed below. In some cases, the functional moiety is attached to the backbone through a linker group, such as a substituted or unsubstituted alkyl, a substituted or unsubstituted alkenyl, or a substituted or unsubstituted carbonyl (e.g., a substituted or unsubstituted carboxyl). In some examples, one or more double bonds present in Formula II can be in an E-configuration. In some examples, one or more double bonds present in Formula II can be in a Z-configuration.

In some cases, the chain polymer structure can be prepared from an acrylic- or a methacrylic-containing monomer to form a backbone according to Formula III below:

Formulla III

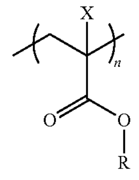

In Formula III, n is in a range of from 10 to 1000 (e.g., from 15 to 750, from 20 to 700, from 25 to 650, from 50 to 600, from 100 to 500, or from 200 to 400). Also in Formula III, R includes a functional moiety that can impart a functional pretreatment characteristic to the metal surface (e.g., the functional moiety can be a corrosion inhibitor, an adhesion promoter, a lubricant, a humectant, and/or a weld promoter as described below). Optionally, the functional moiety can include an ethylene oxide group, a phosphonic acid group, a hydroxyethyl group, a 2-methacryloyloxyethyl group, a 2,2,2-trifluoroethyl group, or a butyl group. Further functional groups that can be used in the graft copolymer pretreatment compositions are detailed below. In some cases, the functional moiety is attached to the backbone through a linker group, such as a substituted or unsubstituted alkyl, a substituted or unsubstituted alkenyl, or a substituted or unsubstituted carbonyl (e.g., a substituted or unsubstituted carboxyl). Further in Formula III, X is hydrogen when the polymer is prepared from an acrylic-containing monomer. In Formula III, X is methyl when the polymer is prepared from a methacrylic-containing monomer.

Surface Binding or Bonding Moiety

As further described below, the surface binding or bonding moiety can bind or bond the chain polymer structure described herein to the metal surface by a covalent bond, an ionic bond, a hydrogen bond, a dipolar interaction, or any combination thereof. In some aspects, the surface binding or bonding moiety is a reactive group or groups that can react with and become covalently bonded to the metal surface. Example reactive groups can include, for example, phosphorus-containing moieties (e.g., phosphoric acids, phosphonic acids), silicon-containing moieties (e.g., siloxanes and silanes), sulfur-containing moieties (e.g., sulfuric acids, sulfonic acids), carboxylic acids (e.g., acrylic acids, methacrylic acids), or metal hydrides, among others. In some cases, the reactive group can optionally be substituted with substituents that can provide additional covalent bonding (e.g., additional hydroxyl groups). For example, the hydroxyl functionalities of the phosphorus- or silicon-containing moieties can react at the surface of the metal product, such as directly with metal atoms of the metal product, to form a metal-oxygen-phosphorus bond or a metal-oxygen-silicon bond in a condensation reaction. Optionally, the reactive groups of the graft copolymer pretreatment composition can react with an oxide surface layer of the metal product.

Functional Moieties

In certain aspects, the graft copolymer pretreatment compositions described herein further include at least one functional moiety to impart a functionalization to the metal surface. For example, the at least one functional moiety can be an adhesion promoter, an adhesive, a lubricant, a humectant, a corrosion inhibitor, a weld promoter, or any combination thereof. In some examples, the graft copolymer pretreatment compositions described herein include an adhesion promoter functional moiety. In certain examples, the adhesion promoter functional moiety can be a hydroxyl group, an amine group, a carboxylic acid group, an amide group, a thiol group, an epoxide group, a vinyl group, a diol group, or combinations thereof.

In some examples, the graft copolymer pretreatment compositions described herein include a lubricant functional moiety. For example, the lubricant functional moiety can be polyethylene glycol, polytetrahydrofuran, polyisobutene, polybutadiene, polyisoprene, polysiloxane, or any combination thereof. Incorporating a lubricant functional moiety can disrupt the surface tension between metal products that are stacked together, thus improving de-stacking capability. Additionally, incorporating a lubricant functional moiety can reduce and/or stabilize frictional forces between, for example, a forming die and a sheet metal surface, leading to better formability with reduced earing, reduced wrinkling and tear-off rates, higher processing speeds, reduced galling, enhanced tool life, and improved surface quality in formed metal parts.

In some examples, the graft copolymer pretreatment compositions described herein can include a humectant functional moiety. For example, the humectant functional moiety can be polypropylene glycol, hexylene glycol, butylene glycol, lactic acid, sodium hexametaphosphate, glycerol, sorbitol, xylitol, maltitol, urea, or any combination thereof. Incorporating a humectant functional moiety can disrupt the surface tension between the metal surface and certain aqueous solutions (e.g., additional pretreatment compositions, coatings, cleaning solutions, and the like, or any combination thereof). Additionally, incorporating a humectant functional moiety can provide a metal surface amenable to downstream coating processes, leading to efficient coating processes, uniform coating coverage, and reduced coating waste.

In some examples, the graft copolymer pretreatment compositions described herein include a corrosion inhibitor functional moiety. In some cases, the corrosion inhibitor functional moiety is a galvanic corrosion inhibitor (e.g., an inorganic chemical corrosion inhibitor, an organic corrosion inhibitor, or any combination thereof), or a barrier-type corrosion inhibitor (e.g., an inorganic barrier-type corrosion inhibitor, an organic barrier-type corrosion inhibitor, or any combination thereof). In certain aspects, the graft copolymer pretreatment compositions described herein can include one or more inorganic chemical corrosion inhibitors. The inorganic chemical corrosion inhibitors for use in the pretreatment compositions include any inorganic chemical species capable of chemically inhibiting or preventing corrosion of an aluminum alloy, such as by reacting to form a different chemical (e.g., an oxide) on the surface of the alloy and/or providing additional protection to the surface metal by being embedded in the coating. In certain cases, the graft copolymer pretreatment compositions can optionally include organic corrosion inhibitors. Non-limiting examples of suitable organic corrosion inhibitors include mercaptobenzothiazole (MBT), benzotriazole (BTA), salicylaldoxime, dithiooxamide, quinaldic acid, thioacetamide, 8-hydroxyquinoline (HXQ), and mixtures thereof.

In some examples, the inorganic chemical corrosion inhibitors as described herein include one or more transition metals or salts thereof, and/or one or more rare earth metals or salts thereof. Suitable transition metals for use as inorganic chemical corrosion inhibitors can include, for example, titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), or gold (Au). Suitable rare earth metals for use as inorganic chemical corrosion inhibitors can include, for example, cerium (Ce), scandium (Sc), yttrium (Y), lanthanum (La), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

Optionally, the inorganic chemical corrosion inhibitor is a transition metal salt or a rare earth metal salt. Optionally, the transition metal salt or the rare earth metal salt includes a transition metal salt or a rare earth metal in an oxidation state of +1, +2, +3, +4, +5, or +6. For example, the transition metal salt or the rare earth metal salt can be a salt that includes molybdenum II ions, molybdenum III ions, molybdenum IV ions, molybdenum V ions, molybdenum VI ions, zirconium II ions, zirconium III ions, zirconium IV ions, titanium II ions, titanium III ions, titanium IV ions, cerium II ions, cerium III ions, or cerium IV ions. In certain examples, the metallic ions described above can be incorporated between at least two layers of the graft copolymer pretreatment compositions described herein for enhanced corrosion resistance. For example, a metal product can be coated with the graft copolymer pretreatment composition to form a layer. Metallic ions can be deposited onto the graft copolymer pretreatment composition layer. Optionally, an additional layer of the graft copolymer pretreatment composition can be applied to the resulting product.

In some cases, the rare earth metal salt can be an anhydrous salt. In some cases, the rare earth metal salt can be a hydrated salt, for example, a monohydrate salt, a dihydrate salt, a trihydrate salt, a tetrahydrate salt, a pentahydrate salt, a hexahydrate salt, a heptahydrate salt, an octahydrate salt, a nonahydrate salt, and/or a decahydrate salt. In some examples, the rare earth metal salt is a rare earth metal nitrate. Examples of suitable inorganic chemical corrosion inhibitors include cerium (III) nitrate hexahydrate ($Ce(NO_3)_3 \cdot 6H_2O$), yttrium nitrate hexahydrate ($Y(NO_3)_3 \cdot 6H_2O$), ytterbium nitrate hexahydrate ($Yb(NO_3)_3 \cdot 6H_2O$), and lanthanum nitrate hexahydrate ($La(NO_3)_3 \cdot 6H_2O$).

In certain aspects, multiple layers of the graft copolymer pretreatment compositions described herein can impart corrosion resistance to the metal surface. For example, a corrosion inhibiting coating can include at least a first layer having a graft copolymer pretreatment composition including an anionic functional group (e.g., phosphonic acid) and at least a second layer including multivalent cations (e.g., any transition metal ion). Optionally, the multiple layers can include a third layer having the graft copolymer pretreatment composition including the phosphonic acid functional group. As used herein, multiple layers can refer to a succession of thin films deposited onto the metal surface. For example, multiple layers of the graft copolymer pretreatment compositions can include a first layer deposited onto the metal surface that completely covers the metal surface. Then, a subsequent layer can be deposited onto the first layer that completely covers the first layer, and so on. In certain cases, multiple layers can refer to successive depositions of multiple layers of the graft copolymer pretreatment compositions that form a single amalgamated layer. Composition and morphology of the single amalgamated layer can depend on surface wettability of each of the graft copolymer pretreatment compositions, miscibility of any solvents used to carry the graft copolymer pretreatment compositions, or designed positioning of each of the multiple layers of the graft copolymer pretreatment compositions. Thus, the metal surface can be pretreated with multiple layers of the graft copolymer pretreatment compositions in a layer-by-layer morphology, a mixture morphology, or any desired thin film morphology.

In some examples, the graft copolymer pretreatment compositions described herein include a weld promoter functional moiety. Incorporating a weld promoter functional moiety can disrupt the surface tension between metal products that are contacted for a welding process (e.g., resistance spot welding, resistance seam welding, friction stir welding, gas metal arc welding (e.g., metal inert gas welding or tungsten inert gas welding), plasma arc welding, laser welding, refill friction stir spot welding, any suitable welding process, or any combination thereof). In some embodiments, the weld promoter functional moiety can comprise titanium (Ti), zirconium (Zr), or a combination thereof.

In some examples, the graft copolymer pretreatment compositions described herein include a crosslinkable functional moiety. For example, a metal product can be coated with the graft copolymer pretreatment composition to form a layer. Subsequently, a crosslinking agent can be applied to form covalent or non-covalent bonds with crosslinkable functional moieties of the graft copolymer pretreatment composition layer connecting two or more individual polymer chains. Alternatively, a crosslinking precursor can already be incorporated in the graft copolymer pretreatment composition and be activated by an external stimulus (e.g. heat, light, pH, mechanical activation, or the like).

The crosslinking agent can be a small functional organic molecule (e.g, a bi-functional organic molecule) or a multi-functional organic molecule that reacts with corresponding crosslinkable functional moieties in the graft copolymer pretreatment composition layer. Examples include, but are not limited to, 1,4 phenylenediacryloyl chloride or polyglycidyl ether cyclosiloxane (e.g., CS-697) which form interchain connections by reacting with hydroxy or amino functionalities in the graft copolymer composition, alkyl dithiols in the presence of disulfide moieties, and poly(ethylene glycol) bisazide in the presence of alkynes.

Optionally, bivalent or polyvalent metallic ions can be applied onto the graft copolymer pretreatment composition layer crosslinking suitable crosslinkable moieties in the composition. Moieties forming crosslinks in the presence of bivalent or polyvalent metallic ions include, but are not limited to, carboxylic acid, phosphonic acid, and/or sulfonic acid groups. The inorganic chemical crosslinking agents as described herein include, but are not limited to polyvalent metal cations, such as alkaline earth metals or salts thereof, and/or one or more transition metals or salts thereof, and/or one or more rare earth metals or salts thereof. The metallic ions can be applied from solutions, including aqueous solutions, leading to instantaneous crosslinking. Suitable metals for use as inorganic chemical crosslinking agents can include, for example, beryllium (Be), magnesium (Mg), calcium (Ca), strontium (Sr), barium (Ba), radium (Ra), titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), or gold (Au). Suitable rare earth metals for use as inorganic chemical corrosion inhibitors can include, for example, cerium (Ce), scandium (Sc), yttrium (Y), lanthanum (La), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Certain metallic ions can contribute to multiple functionalities at the same time, such as corrosion inhibition and crosslinking. In certain aspects, the crosslinking agent is a zirconium salt or a zirconium complex, e.g., zirconium bis(acetylacetonate).

Exemplary Graft Copolymer Pretreatment Compositions

In some examples, the graft copolymer pretreatment compositions described herein, along with a binding or bonding moiety, can provide a multi-functional surface coating to the metal surface. In some cases, the graft copolymer pretreatment compositions can include any combination of a binding or bonding moiety, a corrosion inhibitor functional moiety, an adhesion promoter functional moiety, a lubricant functional moiety, a humectant functional moiety, and/or a weld promoter functional moiety. For example, the graft copolymer pretreatment can include a binding or bonding moiety and a lubricant functional moiety. In some cases, the graft copolymer pretreatment can include a binding or bonding moiety and a corrosion inhibiting moiety. In some cases, the graft copolymer pretreatment can include a binding or bonding moiety and an adhesion promoting moiety. In some other cases, the graft copolymer pretreatment can include a binding or bonding moiety, a lubricant functional moiety, and an adhesion promoting moiety. In certain examples, the graft copolymer pretreatment can include a binding or bonding moiety, a lubricant functional moiety, and a humectant moiety. Further, the graft copolymer pretreatment can include a binding or bonding moiety and a humectant moiety. Still further, the graft copolymer pretreatment can include a binding or bonding moiety and a weld promoting moiety. In some non-limiting examples, the graft copolymer pretreatment can include a binding or bonding moiety, a corrosion inhibiting moiety, and an adhesion promoting moiety. In certain aspects, the graft copolymer pretreatment can include a binding or bonding moiety, a corrosion inhibiting moiety, an adhesion promoting moiety, and a lubricant functional moiety. In some examples, the graft copolymer pretreatment can include a binding or bonding moiety, a corrosion inhibiting moiety, an adhesion promoting moiety, and a weld promoting moiety. In some aspects, the graft copolymer pretreatment can include a binding or bonding moiety, a corrosion inhibiting moiety, and a lubricant functional moiety. These are a few non-limiting examples, as the graft copolymer pretreatment can include a binding or bonding moiety and any combination of any suitable functional moieties.

An exemplary graft copolymer pretreatment composition as described herein, including the surface binding moiety and functional moieties, is depicted in Formula IV below:

Formula IV

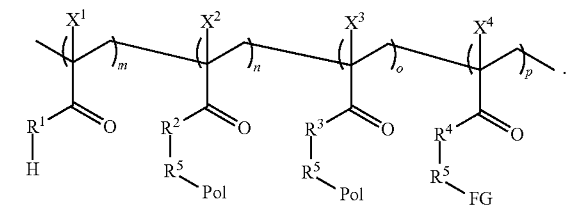

In Formula IV, $X^1$, $X^2$, $X^3$, and $X^4$ are each independently selected from hydrogen and methyl. Also in Formula IV, each of m, n, o, and p is independently and optionally present in a range of from 1 to 1000 (e.g., from 1 to 100, from 1 to 50, or from 1 to 30). In some examples, one or more of m, n, o, and p is present (e.g., two of m, n, o, and p are present; three of m, n, o, and p are present; or each of m, n, o, and p are present). Further in Formula IV, $R^1$, $R^2$, $R^3$, and $R^4$ are each independently selected, if present, from —O— or —$NR^6$—, wherein $R^6$ is substituted or unsubstituted alkyl, substituted or unsubstituted alkenyl, substituted or unsubstituted alkynyl, substituted or unsubstituted aryl, substituted or unsubstituted heteroaryl, substituted or unsubstituted cycloalkyl, or substituted or unsubstituted heterocycloalkyl. Additionally in Formula IV, $R^5$ is a spacer group, for example, $(CH_2)_q$, wherein q is in the range of 1 to 30 (e.g., q=1-30, q=1-25, q=1-20, q=1-15, q=1-10, q=1-5, q=5-30 q=5-25, q=5-20, q=5-15, q=5-10 q=10-30, q=10-25, q=10-20, q=10-15, q=15-30, q=15-25, q=15-20, q=20-30, q=20-25, or q=25-30).

Further in Formula IV, A is a surface binding or bonding moiety as described herein. Optionally, A is selected from the group consisting of phosphonic acid ($PO_3H_2$), a carboxylic acid (COOH), a trialkoxysilyl group (—$Si(OR)_3$, wherein R is an alkyl, alkenyl, alkynyl, heteroalkyl, heteroalkenyl, heteroalkynyl cycloalkyl, cycloalkenyl, cycloalkynyl, heterocycloalkyl, heterocycloalkenyl, or heterocycloalkynyl group), and/or various catechol derivatives as shown in Formula V and Formula VI below:

Formula V

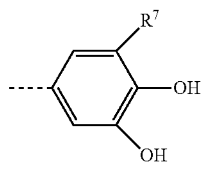

Formula VI

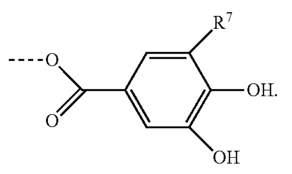

In Formula V and Formula VI, $R^7$ is selected from a hydrogen, a hydroxyl group, an electron-withdrawing group (e.g., a nitro group, a carboxy group, or a halide (e.g., fluoride, chloride, bromide, or iodide)).

In some examples, Pol in Formula IV is a functional moiety that is optionally present. In some examples, Pol is a polymeric chain that can function as a lubricant, such as a poly(ethylene glycol) chain, a poly(tetrahydrofuran) chain, a poly(isoprene) chain, a hydrogenated poly(isoprene) chain, a poly(butadiene) chain, a hydrogenated poly(butadiene) chain, or a polyisobutene chain.

In some cases, FG in Formula IV is a functional moiety that is optionally present, wherein the functional moiety can be an adhesive compound or any other functional moiety as described herein. Optionally, FB can be a hydroxyl, an amide, a thiol, an epoxide, a vinyl, a diol, a phosphonic acid, a carboxylic acid, a sulfonic acid, a multivalent cation including any transition metal ion, or any rare earth metal ion. In some non-limiting examples, when FG is a phosphonic acid, any one of a molybdenum ion, zirconium ion, or titanium ion can be incorporated into the graft copolymer pretreatment composition. In some cases, FG can be a halide, an ethylene oxide, a trialkoxysilyl, a hydroxyethyl group, a 2-methacryloyloxyethyl group, a 2,2,2-trifluoroethyl group, or a butyl group.

Graft Copolymer Pretreatment Composition-Treated Aluminum Alloys

Disclosed herein are metals and alloys, such as aluminum alloys, containing at least one surface that is treated with a graft copolymer pretreatment composition as described herein. The coatings described herein are suitable for providing corrosion protection, improved adhesion, lubrication, improved wetting, and/or improved weld performance to any metal or alloy (e.g., an aluminum alloy). The graft copolymer pretreatment compositions disclosed herein may also be referred to as coatings, films, or layers. While aluminum alloys are described and exemplified, the compositions and methods described herein may also be used to treat other metals and alloys, including mild steel, galvanized steel, and magnesium alloys, to name a few, as set forth above.

The disclosed coated metals and/or alloys have a surface coating layer that includes a polymer backbone (e.g., a chain polymer polymerized from acrylic monomers or methacrylic monomers), at least one phosphonate bonding moiety attached to the polymer backbone and configured to bond the graft copolymer pretreatment compositions to the metal and/or alloy surface, and at least one functional moiety attached to the polymer backbone configured to impart a surface functionalization to the metal and/or alloy surface. As described above, the surface functionalization includes resistance to corrosion, improved adhesion, lubrication, improved wetting, and/or improved weld performance.

Optionally, the method includes a step of degreasing the aluminum alloy surface and/or a step of etching the aluminum alloy surface prior to the coating application. The method can further include cleaning the aluminum alloy, rinsing the aluminum alloy, and drying the aluminum alloy prior to applying the pretreatment solution.

In some examples, at least one surface of a metal and/or alloy (e.g., an aluminum alloy substrate, such as an aluminum alloy coil) can be coated by applying a graft copolymer pretreatment composition as described herein to the alloy to form an initial coating layer. The pretreatment composition can be applied to at least one surface of an aluminum alloy by any suitable method. In some cases, the graft copolymer pretreatment compositions are coated from a solution containing the graft copolymer pretreatment compositions (e.g., an aqueous graft copolymer pretreatment solution, an organic solvent graft copolymer pretreatment solution, or a combination thereof). For example, the coatings described herein can be applied by roll coating, spray coating, dip coating, electrodeposition, glaze coating, or drop coating a suitable graft copolymer pretreatment solution. These methods are generally known in the art.

Optionally, after applying the graft copolymer pretreatment solution, the graft copolymer pretreatment solution can be cured to form an aluminum alloy that includes a coating layer of the graft copolymer pretreatment composition. For example, curing the graft copolymer pretreatment solution can include heating the metal or alloy, and/or the graft copolymer pretreatment solution, to a temperature within 90% of a glass transition temperature ($T_g$) of the polymer backbone to remove residual solvents without any deleterious effects to the graft copolymer pretreatment composition that is in solution. After curing, the graft copolymer pretreatment composition becomes a coating layer having the graft copolymer pretreatment composition as desired (e.g., including any one of, any combination of, or all of a corrosion inhibitor, an adhesion promoter, a lubricant, a humectant, a weld promoter, a hydrophobic functionality (e.g., a self-cleaning surface and/or a water-repellant surface), an oleophobic functionality (e.g., an anti-fouling surface), a hydrophilic functionality (e.g., a biocompatible surface), an optical functionality (e.g., a dye, a pigment, an optical waveguide, a photoluminescent surface, or a negative refractive index surface), or any combination thereof).

Optionally, after applying the graft copolymer pretreatment solution, the polymer layer can be crosslinked by applying a crosslinking agent or a solution thereof by incubation, dipping, rolling, spraying, or any suitable application technique. Crosslinking leads to an increased structural stability and robustness of the graft copolymer pretreatment composition layers. In contact with a good solvent, typically water, the crosslinked polymer layer swells and forms a polymer gel layer. A polymer gel shows viscoelastic properties that can improve lubrication.

Optionally, the coated aluminum alloys can be part of a joined structure including the coated aluminum alloy and a second metal or alloy of a different composition. For example, the coated aluminum alloy can be a 1xxx series alloy, a 2xxx series alloy, a 3xxx series alloy, a 4xxx series alloy, a 5xxx series alloy, a 6xxx series alloy, a 7xxx series alloy, or an 8xxx series alloy, prepared from a cast aluminum alloy product, that is joined to another alloy or metal.

Optionally, the aluminum alloy can be a 1xxx series aluminum alloy according to one of the following aluminum alloy designations: AA1100, AA1100A, AA1200, AA1200A, AA1300, AA1110, AA1120, AA1230, AA1230A, AA1235, AA1435, AA1145, AA1345, AA1445, AA1150, AA1350, AA1350A, AA1450, AA1370, AA1275, AA1185, AA1285, AA1385, AA1188, AA1190, AA1290, AA1193, AA1198, or AA1199.

Optionally, the aluminum alloy can be a 2xxx series aluminum alloy according to one of the following aluminum alloy designations: AA2001, A2002, AA2004, AA2005, AA2006, AA2007, AA2007A, AA2007B, AA2008, AA2009, AA2010, AA2011, AA2011A, AA2111, AA2111A, AA2111B, AA2012, AA2013, AA2014, AA2014A, AA2214, AA2015, AA2016, AA2017, AA2017A, AA2117, AA2018, AA2218, AA2618, AA2618A, AA2219, AA2319, AA2419, AA2519, AA2021, AA2022, AA2023, AA2024, AA2024A, AA2124, AA2224, AA2224A, AA2324, AA2424, AA2524, AA2624, AA2724, AA2824, AA2025, AA2026, AA2027, AA2028, AA2028A, AA2028B, AA2028C, AA2029, AA2030, AA2031, AA2032, AA2034, AA2036, AA2037, AA2038, AA2039, AA2139, AA2040, AA2041, AA2044, AA2045, AA2050, AA2055, AA2056, AA2060, AA2065, AA2070, AA2076, AA2090, AA2091, AA2094, AA2095, AA2195, AA2295, AA2196, AA2296, AA2097, AA2197, AA2297, AA2397, AA2098, AA2198, AA2099, or AA2199.

Optionally, the aluminum alloy can be a 3xxx series aluminum alloy according to one of the following aluminum alloy designations: AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, or AA3065.

Optionally, the aluminum alloy can be a 4xxx series aluminum alloy according to one of the following aluminum alloy designations: AA4004, AA4104, AA4006, AA4007, AA4008, AA4009, AA4010, AA4013, AA4014, AA4015, AA4015A, AA4115, AA4016, AA4017, AA4018, AA4019, AA4020, AA4021, AA4026, AA4032, AA4043, AA4043A, AA4143, AA4343, AA4643, AA4943, AA4044, AA4045, AA4145, AA4145A, AA4046, AA4047, AA4047A, or AA4147.

Optionally, the aluminum alloy can be a 5xxx series aluminum alloy according to one of the following aluminum alloy designations: AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, or AA5088.

Optionally, the aluminum alloy can be a 6xxx series aluminum alloy according to one of the following aluminum alloy designations: AA6101, AA6101A, AA6101B, AA6201, AA6201A, AA6401, AA6501, AA6002, AA6003, AA6103, AA6005, AA6005A, AA6005B, AA6005C, AA6105, AA6205, AA6305, AA6006, AA6106, AA6206, AA6306, AA6008, AA6009, AA6010, AA6110, AA6110A, AA6011, AA6111, AA6012, AA6012A, AA6013, AA6113, AA6014, AA6015, AA6016, AA6016A, AA6116, AA6018, AA6019, AA6020, AA6021, AA6022, AA6023, AA6024, AA6025, AA6026, AA6027, AA6028, AA6031, AA6032, AA6033, AA6040, AA6041, AA6042, AA6043, AA6151, AA6351, AA6351A, AA6451, AA6951, AA6053, AA6055, AA6056, AA6156, AA6060, AA6160, AA6260, AA6360, AA6460, AA6460B, AA6560, AA6660, AA6061, AA6061A, AA6261, AA6361, AA6162, AA6262, AA6262A, AA6063, AA6063A, AA6463, AA6463A, AA6763, A6963, AA6064, AA6064A, AA6065, AA6066, AA6068, AA6069, AA6070, AA6081, AA6181, AA6181A, AA6082, AA6082A, AA6182, AA6091, or AA6092.

Optionally, the aluminum alloy can be a 7xxx series aluminum alloy according to one of the following aluminum alloy designations: AA7011, AA7019, AA7020, AA7021, AA7039, AA7072, AA7075, AA7085, AA7108, AA7108A, AA7015, AA7017, AA7018, AA7019A, AA7024, AA7025, AA7028, AA7030, AA7031, AA7033, AA7035, AA7035A, AA7046, AA7046A, AA7003, AA7004, AA7005, AA7009, AA7010, AA7011, AA7012, AA7014, AA7016, AA7116, AA7122, AA7023, AA7026, AA7029, AA7129, AA7229, AA7032, AA7033, AA7034, AA7036, AA7136, AA7037, AA7040, AA7140, AA7041, AA7049, AA7049A, AA7149, AA7249, AA7349, AA7449, AA7050, AA7050A, AA7150, AA7250, AA7055, AA7155, AA7255, AA7056, AA7060, AA7064, AA7065, AA7068, AA7168, AA7175, AA7475, AA7076, AA7178, AA7278, AA7278A, AA7081, AA7181, AA7185, AA7090, AA7093, AA7095, or AA7099.

Optionally, the aluminum alloy can be an 8xxx series aluminum alloy according to one of the following aluminum alloy designations: AA8005, AA8006, AA8007, AA8008, AA8010, AA8011, AA8011A, AA8111, AA8211, AA8112, AA8014, AA8015, AA8016, AA8017, AA8018, AA8019, AA8021, AA8021A, AA8021B, AA8022, AA8023, AA8024, AA8025, AA8026, AA8030, AA8130, AA8040, AA8050, AA8150, AA8076, AA8076A, AA8176, AA8077, AA8177, AA8079, AA8090, AA8091, or AA8093.

Optionally, the coated aluminum alloys can be provided in any metallurgical state, for example, any suitable temper or condition. For example, the aluminum alloys can be provided in an F temper, an O temper, or a W temper as described above. In some cases, heat treatable aluminum alloys (e.g., 2xxx series aluminum alloys, 6xxx series aluminum alloys, 7xxx series aluminum alloys, and certain 8xxx aluminum alloys) can be subjected to a natural aging process and/or an artificial aging process. As described herein, a natural aging process includes storing the age-hardenable aluminum alloys at a temperature of about room temperature for a period of time to provide the age-hardened aluminum alloys in a T1 temper, a T2 temper, a T3 temper, or a T4 temper. Optionally, the age-hardenable aluminum alloys can be subjected to an artificial aging process including heating the aluminum alloys to an elevated temperature that is less than the liquidus temperature of the aluminum alloy to provide the age-hardened aluminum alloys in a T5 temper, a T6x temper, a T7 temper, a T8x temper, or a T9 temper. In other examples, strain-hardenable aluminum alloys (e.g., 1xxx series aluminum alloys, 3xxx series aluminum alloys, 4xxx series aluminum alloys, 5xxx series aluminum alloys, and certain 8xxx series aluminum alloys) can be subjected to a strain hardening process to provide the strain-hardened aluminum alloys in an Hxx temper as described above. As described herein, a strain hardening process includes cold working and optionally annealing the strain-hardenable aluminum alloys to provide the strain-hardened aluminum alloys in an H temper, such as an Hx1 temper, an Hx2 temper, an Hx3 temper, an Hx4 temper, an Hx5 temper, an Hx6 temper, and Hx7 temper, an Hx8 temper, or an Hx9 temper.

The coated aluminum alloy can be fabricated into an aluminum alloy product, including an aluminum alloy plate, sheet, or shate. In some examples, the alloy can be fabricated into an aluminum alloy sheet including the graft copolymer coating described herein having any desired functionality. In some examples, the alloy can be fabricated into a shaped product formed from any aluminum alloy sheet described herein and including any coating layer formed from a graft copolymer pretreatment composition as described herein. In some examples, the aluminum alloy is a shaped product formed from any aluminum alloy sheet described herein and includes any graft copolymer coating described herein, wherein the shaped product is joined to another product formed from a different alloy or a different metal (e.g., a second alloy or a second metal). In some non-limiting examples, the aluminum alloy and the second metal and/or alloy are bonded to form a joint of any suitable configuration, including lap, edge, butt, T-butt, hem, T-edge, and the like.

The disclosed graft copolymer coatings and methods tailor the surface characteristics of aluminum and aluminum alloys. Aluminum alloys that can benefit from the protective coating layers disclosed herein include those used in the motor vehicle industry (e.g., in automotive joints), manufacturing applications, electronics applications, industrial applications, and others. Optionally, the alloy is a part of a joined structure such as, for example, the chassis of an automobile or other motor vehicle. The chassis can be in the body in white stage or painted.

Polymer Synthesis

The polymers for the pretreatment compositions described herein can be prepared by synthesizing a polymer having surface binding or bonding moieties and functional moieties by polymerizing or copolymerizing suitable monomers by a chain polymerization method, such as radical polymerization, cationic polymerization, anionic polymerization, catalytic polymerization, or group transfer polymerization. In some cases, the polymer backbone is a homopolymer backbone provided by polymerizing a single type of repeat unit (e.g., a monomer). Optionally, the polymer backbone can be a copolymer backbone provided by polymerizing a variety of different monomers by a chain polymerization method, such as radical polymerization, cationic polymerization, anionic polymerization, catalytic polymerization, or group transfer polymerization. Each repeat unit can include a surface binding or bonding moiety, a functional moiety, both a surface binding or bonding moiety and a functional moiety, or the repeat unit can be devoid of a pendant functional moiety (e.g., a backbone spacer).

In some non-limiting cases, the polymers for the pretreatment compositions described herein can be prepared by synthesizing a polymer backbone having surface binding moieties and optional functional moieties by a radical polymerization or copolymerization of methacrylic or monomers, such as acrylic methyl methacrylate, methacryloyloxy(methyl)phosphonic acid (MMPA), hydroxyxyethyl methacrylate (HEMA), or poly(ethylene glycol) methyl ether methacrylate (PEGMEMA). Number average molecular weights ($M_n$) of the poly(ethylene glycol) chain can range, for example, from 300 to 5000 (e.g., 300, 400, 700, 1000, 2000, or 5000).

In certain aspects, a polymerization can be performed using a monomer (e.g., poly(ethylene glycol) methyl ether methacrylate, having a $M_n$=2000 (PEGMEMA-2000)), an initiator (e.g., ammonium persulfate (APS)), and a base (e.g., N,N,N',N'-tetramethylenediamine (TEMED)) in a predetermined stoichiometric ratio in a solvent (e.g., water, methanol, ethanol, isopropanol, n-butanol, dimethylformamide, dimethyl sulfoxide, acetonitrile, acetone, tetrahydrofuran, methyl ethyl ketone, or any combination thereof). Additionally, a copolymer polymerization can be performed using at least two monomers (e.g., PEGMEMA-2000 and (methacryloyloxy) methylphosphonic acid (MMPA)), an initiator (e.g., APS), and a base (e.g., TEMED) in a predetermined stoichiometric ratio in a solvent as described above. Exemplary synthetic methods for preparing polymers for the pretreatment compositions described herein are detailed below in Example 1.

Methods of Use

The disclosed aluminum alloy products provided in the tempers described herein may be incorporated into existing processes and lines for production of aluminum alloy products, such as hot formed aluminum products (for example, hot formed automotive structural members), thereby improving the processes and the resulting products in a streamlined and economical manner. The systems and methods for performing the forming processes and producing the products described herein are included within the scope of the disclosure.

The described aluminum alloy products and processes can be advantageously employed in the transportation industry, including, but not limited to, automotive manufacturing, truck manufacturing, manufacturing of ships and boats, manufacturing of trains, airplanes and spacecraft manufacturing Some non-limiting examples of the automotive parts include floor panels, rear walls, rockers, motor hoods, fenders, roofs, door panels, B-pillars, body sides, rockers, or crash members. The term "automotive" and the related terms as used herein are not limited to automobiles and include various vehicle classes, such as, automobiles, cars, buses, motorcycles, marine vehicles, off highway vehicles, light trucks, trucks, or lorries. However, aluminum alloy products are not limited to automotive parts; other types of aluminum products manufactured according to the processes described in this application are envisioned. For example, the described processes can be advantageously employed in manufacturing of various parts of mechanical and other devices or machinery, including weapons, tools, bodies of electronic devices, and other parts and devices.

The aluminum alloy products and processes described herein can also be used in electronics applications, to prepare, for example, external and internal encasements. For example, the alloys and methods described herein can also be used to prepare housings for electronic devices, including mobile phones and tablet computers. In some examples, the alloys can be used to prepare housings for the outer casing of mobile phones (e.g., smart phones) and tablet bottom chassis.

Illustrations of Suitable Compositions, Products, and Methods

Illustration 1 is a graft copolymer pretreatment composition, comprising: a polymer backbone; at least one surface binding or bonding moiety attached to the polymer backbone and configured to bind or bond the polymer backbone to a first surface of a metal product; at least one functional moiety attached to the polymer backbone and configured to provide at least a first surface functionalization to the first surface of the metal product; and at least one second functional moiety attached to the polymer backbone and configured to provide at least a second surface functionalization to the first surface of the metal product, wherein the at least one functional moiety and the at least one second functional moiety provide a multi-functional surface coating.

Illustration 2 is the graft copolymer pretreatment composition of any preceding or subsequent illustration, wherein the polymer backbone comprises an acrylic class chain polymer structure, a methacrylic class chain polymer structure, a vinyl class chain polymer structure, a diene class chain polymer structure, a vinylidene class chain polymer structure, or any combination thereof.

Illustration 3 is the graft copolymer pretreatment composition of any preceding or subsequent illustration, wherein the polymer backbone is poly(methyl methacrylate), poly(ethyl methacrylate), poly(ethyl acrylate), polyacrylonitrile, polyethylene, polypropylene, polystyrene, poly(vinyl chloride), poly(vinyl acetate), poly(vinyl alcohol), polybutadiene, polyisoprene, polychloroprene, or any combination thereof.

Illustration 4 is the graft copolymer pretreatment composition of any preceding or subsequent illustration, wherein the at least one surface binding or bonding moiety comprises a phosphonate group, a carboxyl group, a catechol group, or a trialkoxysilyl group.

Illustration 5 is the graft copolymer pretreatment composition of any preceding or subsequent illustration, wherein the phosphonate group comprises poly(vinyl phosphonate).

Illustration 6 is the graft copolymer pretreatment composition of any preceding or subsequent illustration, wherein the at least one functional moiety comprises an adhesion promoter.

Illustration 7 is the graft copolymer pretreatment composition of any preceding or subsequent illustration, wherein the adhesion promoter comprises a hydroxyl group, an amide group, a thiol group, an epoxide group, a vinyl group, a diol group, an adhesive composition, a covalent bonding group, or an ionic bonding group.

Illustration 8 is the graft copolymer pretreatment composition of any preceding or subsequent illustration, wherein the at least one functional moiety comprises a polymer side chain that provides a lubricating function.

Illustration 9 is the graft copolymer pretreatment composition of any preceding or subsequent illustration, wherein the polymer side chain that provides a lubricating function comprises polyethylene glycol, polytetrahydrofuran, polyisobutene, polysilicone, or any combination thereof.

Illustration 10 is the graft copolymer pretreatment composition of any preceding or subsequent illustration, wherein the at least one functional moiety comprises a humectant.

Illustration 11 is the graft copolymer pretreatment composition of any preceding or subsequent illustration, wherein the humectant comprises polypropylene glycol, hexylene glycol, butylene glycol, lactic acid, sodium hexametaphosphate, glycerol, sorbitol, xylitol, maltitol, urea, or any combination thereof.

Illustration 12 is the graft copolymer pretreatment composition of any preceding or subsequent illustration, wherein the at least one functional moiety comprises a weld promoter.

Illustration 13 is the graft copolymer pretreatment composition of any preceding or subsequent illustration, wherein the at least one functional moiety comprises a corrosion inhibitor.

Illustration 14 is the graft copolymer pretreatment composition of any preceding or subsequent illustration, wherein the corrosion inhibitor comprises an inorganic corrosion inhibitor, an inorganic barrier-type corrosion inhibitor, an organic corrosion inhibitor, an organic barrier-type corrosion inhibitor, or any combination thereof.

Illustration 15 is the graft copolymer pretreatment composition of any preceding or subsequent illustration, wherein the corrosion inhibitor comprises an inorganic corrosion inhibitor and wherein the inorganic corrosion inhibitor comprises a transition metal, a transition metal salt, a rare earth metal, or a rare earth metal salt.

Illustration 16 is the graft copolymer pretreatment composition of any preceding or subsequent illustration, wherein the inorganic corrosion inhibitor comprises a transition metal and wherein the transition metal comprises titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), or gold (Au).

Illustration 17 is the graft copolymer pretreatment composition of any preceding or subsequent illustration, wherein the inorganic corrosion inhibitor comprises a transition metal salt and wherein the transition metal salt comprises a salt of Ti, V, Cr, Mn, Fe, Co, Ni, Cu, Zn, Zr, Nb, Mo, Ru, Rh, Pd, Ag, Cd, Hf, Ta, W, Re, Os, Ir, Pt, or Au.

Illustration 18 is the graft copolymer pretreatment composition of any preceding or subsequent illustration, wherein the inorganic corrosion inhibitor comprises a rare earth metal and wherein the rare earth metal comprises cerium (Ce), scandium (Sc), yttrium (Y), lanthanum (La), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), or lutetium (Lu).

Illustration 19 is the graft copolymer pretreatment composition of any preceding or subsequent illustration, wherein the inorganic corrosion inhibitor comprises a rare earth metal salt and wherein the rare earth metal salt comprises a salt of Ce, Sc, Y, La, Pr, Nd, Pm, Sm, Eu, Gd, Tb, Dy, Ho, Er, Tm, Yb, or Lu.

Illustration 20 is the graft copolymer pretreatment composition of any preceding or subsequent illustration, wherein the corrosion inhibitor comprises an organic corrosion inhibitor and wherein the organic corrosion inhibitor comprises mercaptobenzothiazole, benzotriazole, salicylaldoxime, dithiooxamide, quinaldic acid, thioacetamide, or 8-hydroxyquinoline.

Illustration 21 is the graft copolymer pretreatment composition of any preceding or subsequent illustration, wherein the at least one second functional moiety comprises an adhesion promoter, a polymer side chain that provides a lubricating function, a humectant, a weld promoter, or a corrosion inhibitor.

Illustration 22 is the graft copolymer pretreatment composition of any preceding or subsequent illustration, wherein the graft copolymer pretreatment composition is crosslinked with a crosslinking agent.

Illustration 23 is the graft copolymer pretreatment composition of any preceding or subsequent illustration, wherein the crosslinking agent is a zirconium salt or a zirconium complex.

Illustration 24 is the graft copolymer pretreatment composition of any preceding or subsequent illustration, wherein the crosslinking agent is an aqueous solution of the zirconium salt or the zirconium complex.

Illustration 25 is a method of pretreating at least a portion of a metal surface, comprising: applying the graft copolymer pretreatment composition of any preceding or subsequent illustration to at least the portion of the metal surface.

Illustration 26 is the method of any preceding or subsequent illustration, wherein the applying the graft copolymer pretreatment composition comprises solution coating at least the portion of the metal surface.

Illustration 27 is the method of any preceding illustration, wherein the solution coating comprises roll-coating, immersion coating, enrobing, spin-coating, or spray coating at least the portion of the metal surface.

The following examples will serve to further illustrate the present invention without, however, constituting any limitation thereof. On the contrary, it is to be clearly understood that resort may be had to various embodiments, modifications, and equivalents thereof which, after reading the description herein, may suggest themselves to those skilled in the art without departing from the spirit of the invention.

EXAMPLES

Example 1: Polymer Synthesis

Chemicals and materials used in the polymer synthesis include poly(ethylene glycol) methyl ether methacrylate, having a number average molecular weight (Mn) 2000 (PEGMEMA-2000), poly(ethylene glycol) methyl ether methacrylate with a Mu 950 (PEGMEMA-950), poly(ethylene glycol) methyl ether methacrylate with a $M_n$ 500 (PEGMEMA-500), poly(ethylene glycol) methyl ether methacrylate, having a $M_n$ 300 (PEGMEMA-300), 2-hydroxyethyl methacrylate (HEMA), butyl methacrylate (BMA), 2-methacryloyloxyethyl phosphorylcholine (MPC), 2,2,2-trifluoroethyl methacrylate (TFEMA), 4,4'-azobis(4-cyanovaleric acid) (V-501), (methacryloyloxy)methylphosphonic acid (MMPA), ammonium persulfate (APS), N,N,N',N'-tetramethylenediamine (TEMED), and 4-cyano-4-(phenylcarbonothioylthio) pentanoic acid. Products were analyzed by gel permeation chromatography (GPC) and nuclear magnetic resonance (NMR) spectroscopy.

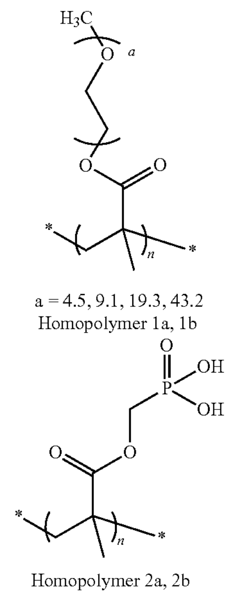

a = 4.5, 9.1, 19.3, 43.2
Homopolymer 1a, 1b

Homopolymer 2a, 2b

Homopolymer 1a: Poly(methacrylate)-graft-polyethylene glycol). The polymerization was performed using PEGMEMA-2000, APS as the initiator, and TEMED as the base in a stoichiometric ratio of 1.0/0.5/2.3 equivalents. PEGMEMA-2000 (0.6 g; 50 wt. % aqueous solution, 0.15 mmol), 17.4 mg APS (0.076 mmol), and 3 mL water were added to a Schlenk flask equipped with a magnetic stir bar. The flask was sealed, and the solution was subjected to three freeze-pump-thaw cycles. Then, TEMED (52 μL, 0.345 mmol) was added under a positive argon pressure. The flask was resealed, and the mixture was stirred at 400 revolutions per minute (rpm) at room temperature for 2 hours. Homopolymer 1a was obtained by freeze-drying.

Homopolymer 1b: Poly(methacrylate)-graft-poly(ethylene glycol). The polymerization was performed using PEGMEMA-2000 as the monomer and 5 mol % V-501 as the initiator. PEGMEMA-2000 (0.6 g, 50 wt. % aqueous solution, 0.15 mmol), 2.1 mg V-501 (0.0075 mmol) and 3 mL water were added to a Schlenk flask equipped with a magnetic stir bar. The flask was sealed, and the solution was subjected to three freeze-pump-thaw cycles. The flask was placed in a preheated oil bath at 70° C. and the mixture was stirred at 400 rpm for 18 hours. Homopolymer 1b was obtained by freeze-drying.

Homopolymer 2a: Poly(methacryloyloxy)methylphosphonic acid). The polymerization was performed with a MMPA monomer, APS as the initiator, and TEMED as the base in a stoichiometric ratio of 1.0/0.5/2.3 equivalents. MMPA (0.3 g, 1.67 mmol), 193 mg APS (0.846 mmol) and 33.3 mL water were added to a Schlenk flask equipped with a magnetic stir bar. The flask was sealed, and the solution was subjected to three freeze-pump-thaw cycles. TEMED (574 μL, 3.83 mmol) was added under positive argon pressure. The flask was resealed, and the mixture was stirred at 400 rpm at room temperature for 2 hours. Homopolymer 2a was obtained by freeze-drying.

Homopolymer 2b: Poly(methacryloyloxy)methylphosphonic acid) 2b. The polymerization was performed using MMPA monomer and 5 mol % V-501 as the initiator. MMPA (0.3 g, 1.67 mmol), 23.3 mg V-501 (0.0831 mmol), and 0.6 mL water were added to a Schlenk flask equipped with a magnetic stir bar. The flask was sealed, and the solution was subjected to three freeze-pump-thaw cycles. The flask was placed in a preheated oil bath at 70° C. and the mixture was stirred at 400 rpm for 104 hours. Homopolymer 2b was obtained by freeze-drying.

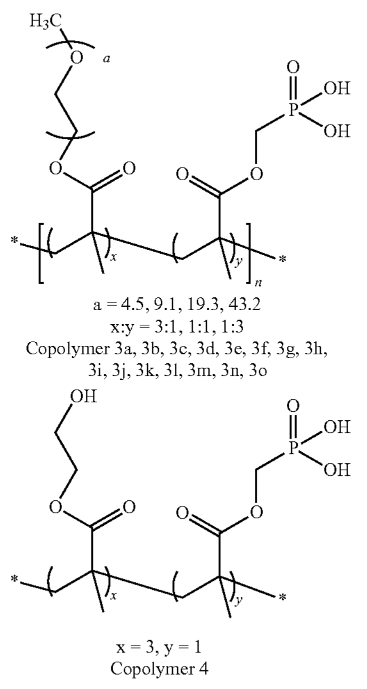

a = 4.5, 9.1, 19.3, 43.2
x:y = 3:1, 1:1, 1:3
Copolymer 3a, 3b, 3c, 3d, 3e, 3f, 3g, 3h, 3i, 3j, 3k, 3l, 3m, 3n, 3o x = 3, y = 1
Copolymer 4

Copolymer 3a: Poly(methacryloyloxymethylphosphonic acid)-co-(methacrylate-graft-poly(ethylene oxide)). The polymerization was performed using monomers PEGMEMA-300 and MMPA in a stoichiometric ratio of 3.0/1.0, with V-501 as the initiator. PEGMEMA-300 (276 mg, 0.92 mmol), MMPA (55.8 mg, 0.31 mmol), V-501 (17.2 mg, 0.062 mmol) and 0.3 mL methanol were added to a Schlenk flask equipped with a magnetic stir bar. The flask was sealed, and the solution was subjected to three freeze-pump-thaw cycles. The flask was placed in a preheated oil bath at 70° C., and the mixture was stirred at 400 rpm for 72 hours. Copolymer 3a was obtained by freeze-drying.

Copolymer 3b: Poly(methacryloyloxymethylphosphonic acid)-co-(methacrylate-graft-poly(ethylene oxide)). The polymerization was carried using monomers PEGMEMA-300 and MMPA in a stoichiometric ratio of 1.0/1.0, with V-501 as the initiator. PEGMEMA-300 (186 mg, 0.62 mmol), MMPA (111.7 mg, 0.62 mmol), V-501 (17.4 mg, 0.062 mmol), and 0.3 mL methanol were added to a Schlenk flask equipped with a magnetic stir bar. The flask was sealed, and the solution was subjected to three freeze-pump-thaw cycles. The flask was placed in a preheated oil bath at 70° C. and the mixture was stirred at 400 rpm for 72 hours. Copolymer 3b was obtained by freeze-drying.

Copolymer 3c: Poly(methacryloyloxymethylphosphonic acid)-co-(methacrylate-graft-poly(ethylene oxide)). The polymerization was performed using monomers PEGMEMA-300 and MMPA in a stoichiometric ratio of 1.0/3.0, with V-501 as the initiator. PEGMEMA-300 (108 mg, 0.36 mmol), MMPA (192.7 mg, 1.07 mmol), V-501 (20.0 mg, 0.072 mmol), and 0.3 mL methanol were added to a Schlenk flask equipped with a magnetic stir bar. The flask was sealed, and the solution was subjected to three freeze-pump-thaw cycles. The flask was placed in a preheated oil bath at 70° C. and the mixture was stirred at 400 rpm for 72 hours. Copolymer 3c was obtained by freeze-drying.

Copolymer 3d: Poly(methacryloyloxymethylphosphonic acid)-co-(methacrylate-graft-poly(ethylene oxide)). The polymerization was performed using monomers PEGMEMA-500 and MMPA in a stoichiometric ratio of 3.0/1.0, with V-501 as the initiator. PEGMEMA-500 (267.8 mg, 0.54 mmol), MMPA (32.2 mg, 0.18 mmol), V-501 (10 mg, 0.034 mmol), 0.3 mL methanol and 0.3 mL water were added to a Schlenk flask equipped with a magnetic stir bar. The flask was sealed and deoxygenated by purging the volume above the solution for 15 minutes with argon, followed by bubbling argon through the solution for 5 minutes. The flask was placed in a preheated oil bath at 70° C. and the mixture was stirred at 400 rpm for 72 hours. Copolymer 3d was obtained by freeze-drying.

Copolymer 3e: Poly(methacryloyloxymethylphosphonic acid)-co-(methacrylate-graft-poly(ethylene oxide)). The polymerization was performed using monomers PEGMEMA-500 and MMPA in a stoichiometric ratio of 1.0/1.0, with V-501 as the initiator. PEGMEMA-500 (220.6 mg, 0.44 mmol), MMPA (79.4 mg, 0.44 mmol), V-501 (6.2 mg, 0.022 mmol), 0.3 mL methanol and 0.3 mL water were added to a Schlenk flask equipped with a magnetic stir bar. The flask was sealed and deoxygenated by purging the volume above the solution for 15 minutes with argon, followed by bubbling argon through the solution for 5 minutes. The flask was placed in a preheated oil bath at 70° C. and the mixture was stirred at 400 rpm for 72 hours. Copolymer 3e was obtained by freeze-drying.

Copolymer 3f: Poly(methacryloyloxymethylphosphonic acid)-co-(methacrylate-graft-poly(ethylene oxide)). The polymerization was performed using monomers PEGMEMA-500 and MMPA in a stoichiometric ratio of 1.0/3.0, with V-501 as the initiator. PEGMEMA-500 (144.2 mg, 0.29 mmol), MMPA (155.8 mg, 0.87 mmol), V-501 (8.1 mg, 0.029 mmol), 0.15 mL methanol and 0.15 mL water were added to a Schlenk flask equipped with a magnetic stir bar. The flask was sealed and deoxygenated by purging the volume above the solution for 15 minutes with argon, followed by bubbling argon through the solution for 5 minutes. The flask was placed in a preheated oil bath at 70° C. and the mixture was stirred at 400 rpm for 24 hours. Copolymer 3f was obtained by freeze-drying.

Copolymer 3g: Poly(methacryloyloxymethylphosphonic acid)-co-(methacrylate-graft-poly(ethylene oxide)). The polymerization was performed using monomers PEGMEMA-950 and MMPA in a stoichiometric ratio of 3.0/1.0, with V-501 as the initiator. PEGMEMA-950 (282.2 mg, 0.30 mmol), MMPA (17.8 mg, 0.099 mmol), V-501 (5.5 mg, 0.020 mmol), 0.8 mL methanol and 0.8 mL water were added to a Schlenk flask equipped with a magnetic stir bar. The flask was sealed and deoxygenated by purging the volume above the solution for 15 minutes with argon, followed by bubbling argon through the solution for 5 minutes. The flask was placed in a preheated oil bath at 70° C. and the mixture was stirred at 400 rpm for 72 hours. Copolymer 3g was obtained by freeze-drying.

Copolymer 3h: Poly(methacryloyloxymethylphosphonic acid)-co-(methacrylate-graft-poly(ethylene oxide)). The polymerization was performed using monomers PEGMEMA-950 and MMPA in a stoichiometric ratio of 1.0/1.0, with V-501 as the initiator. PEGMEMA-950 (252.2 mg, 0.27 mmol), MMPA (47.8 mg, 0.27 mmol), V-501 (3.7 mg, 0.013 mmol), 0.8 mL methanol and 0.8 mL water were added to a Schlenk flask equipped with a magnetic stir bar. The flask was sealed and deoxygenated by purging the volume above the solution for 15 minutes with argon, followed by bubbling argon through the solution for 5 minutes. The flask was placed in a preheated oil bath at 70° C. and the mixture was stirred at 400 rpm for 72 hours. Copolymer 3h was obtained by freeze-drying.

Copolymer 3i: Poly(methacryloyloxymethylphosphonic acid)-co-(methacrylate-graft-poly(ethylene oxide)). The polymerization was performed using monomers PEGMEMA-950 and MMPA in a stoichiometric ratio of 1.0/3.0, with V-501 as the initiator. PEGMEMA-950 (191.2 mg, 0.20 mmol), MMPA (108.8 mg, 0.60 mmol), V-501 (5.6 mg, 0.020 mmol), 0.4 mL methanol and 0.4 mL water were added to a Schlenk flask equipped with a magnetic stir bar. The flask was sealed and deoxygenated by purging the volume above the solution for 15 minutes with argon, followed by bubbling argon through the solution for 5 minutes. The flask was placed in a preheated oil bath at 70° C. and the mixture was stirred at 400 rpm for 24 hours. Copolymer 3i was obtained by freeze-drying.

Copolymer 3j: Poly(methacryloyloxymethylphosphonic acid)-co-(methacrylate-graft-poly(ethylene oxide)). The polymerization was performed using monomers PEGMEMA-2000 and MMPA in a stoichiometric ratio of 3.0/1.0, with 0.7 wt. % V-501 as the initiator. PEGMEMA-2000 (600 mg, 50 wt. % aqueous solution, 0.15 mmol), 9 mg MMPA (0.05 mmol), 2.2 mg V-501 (0.0078 mmol) and 3 mL water were added to a Schlenk flask equipped with a magnetic stir bar. The flask was sealed, and the solution was subjected to three freeze-pump-thaw cycles. The flask was placed in a preheated oil bath at 70° C., and the mixture was stirred at 400 rpm for 80 hours. Copolymer 3j was obtained by freeze-drying.

Copolymer 3k: Poly(methacryloyloxymethylphosphonic acid)-co-(methacrylate-graft-poly(ethylene oxide)). The polymerization was carried using monomers PEGMEMA-2000 and MMPA in a stoichiometric ratio of 1.0/1.0, with 0.7 wt. % V-501 as the initiator. PEGMEMA-2000 (600 mg, 50 wt. % aqueous solution, 0.15 mmol), 27 mg MMPA (0.15 mmol), 2.3 mg V-501 (0.0082 mmol), and 3 mL water were added to a Schlenk flask equipped with a magnetic stir bar. The flask was sealed, and the solution was subjected to three freeze-pump-thaw cycles. The flask was placed in a preheated oil bath at 70° C. and the mixture was stirred at 400 rpm for 80 hours. Copolymer 3k was obtained by freeze-drying.

Copolymer 3l: Poly(methacryloyloxymethylphosphonic acid)-co-(methacrylate-graft-poly(ethylene oxide)). The polymerization was performed using monomers PEGMEMA-2000 and MMPA in a stoichiometric ratio of 1.0/3.0, with 0.7 wt. % V-501 as the initiator. PEGMEMA-2000 (600 mg, 50 wt. % aqueous solution, 0.15 mmol), 81.1 mg MMPA (0.45 mmol), 2.7 mg V-501 (0.0096 mmol), and 3 mL water were added to a Schlenk flask equipped with a magnetic stir bar. The flask was sealed, and the solution was subjected to three freeze-pump-thaw cycles. The flask was placed in a preheated oil bath at 70° C. and the mixture was stirred at 400 rpm for 80 hours. Copolymer 3l was obtained by freeze-drying.

Copolymer 3m: Poly(methacryloyloxymethylphosphonic acid)-co-(methacrylate-graft-poly(ethylene oxide)). The polymerization was performed using monomers PEGMEMA-2000 and MMPA, with APS as the initiator and TEMED as the base in a stoichiometric ratio of 3.0/1.0/2.0/9.2. PEGMEMA-2000 (583 mg, 50 wt. % aqueous solution, 0.146 mmol), 8.7 mg MMPA (0.0485 mmol), 22.5 mg APS (0.0987 mmol), and 3.9 mL water were added to a Schlenk flask equipped with a magnetic stir bar. The flask was sealed, and the solution was subjected to three freeze-pump-thaw cycles. Then, TEMED (67 µL, 0.446 mmol) was added under positive argon pressure. The flask was resealed, and the mixture was stirred at 400 rpm at room temperature for 2 hours. Copolymer 3m was obtained by freeze-drying.

Copolymer 3n: Poly(methacryloyloxymethylphosphonic acid)-co-(methacrylate-graft-poly(ethylene oxide)). The polymerization was performed using monomers PEGMEMA-2000 and MMPA, with APS as the initiator and TEMED as the base in a stoichiometric ratio of 1.0/1.0/1.0/4.6. PEGMEMA-2000 (550 mg, 50 wt. % aqueous solution, 0.138 mmol), 24.8 mg MMPA (0.138 mmol), 31.9 mg APS (0.140 mmol), and 5.5 mL water were added to a Schlenk flask equipped with a magnetic stir bar. The flask was sealed, and the solution was subjected to three freeze-pump-thaw cycles. TEMED (95 µL, 0.633 mmol) was added under positive argon pressure. The flask was resealed, and the mixture was stirred at 400 rpm at room temperature for 2 hours. Copolymer 3n was obtained by freeze-drying.

Copolymer 3o: Poly(methacryloyloxymethylphosphonic acid)-co-(methacrylate-graft-poly(ethylene oxide)). The polymerization was performed using monomers PEGMEMA-2000 and MMPA, with APS as the initiator and TEMED as the base in a stoichiometric ratio of 1.0/3.0/2.0/9.2. PEGMEMA-2000 (472 mg, 50 wt. % aqueous solution, 0.118 mmol), 63.8 mg MMPA (0.354 mmol), 54.8 mg APS (0.240 mmol), and 9.4 mL water were added to a Schlenk flask equipped with a magnetic stir bar. The flask was sealed, and the solution was subjected to three freeze-pump-thaw cycles. Then, TEMED (162.8 µL, 1.09 mmol) was added under positive argon pressure. The flask was rescaled, and the mixture was stirred at 400 rpm at room temperature for 2 hours. Copolymer 3o was obtained by freeze-drying.

Copolymer 4: Poly hydroxyethyl methacrylate)-co-(methacryloyloxymethylphosphonic acid). The polymerization was performed using monomers HEMA and MMPA in a stoichiometric ratio of 3.0/1.0 with 5 mol % V-501 as the initiator. HEMA (300 mg, 2.31 mmol), 136 mg MMPA (0.77 mmol), 41.3 mg V-501 (0.147 mmol), and 2 mL methanol were added to a Schlenk flask equipped with a magnetic stir bar. The flask was sealed and deoxygenated by purging for 15 minutes with argon, followed by bubbling argon through the solution for 5 minutes. The flask was placed in a preheated oil bath at 70° C. and the mixture was stirred at 400 rpm for 72 hours. Copolymer 4 was obtained by precipitation into n-hexane.

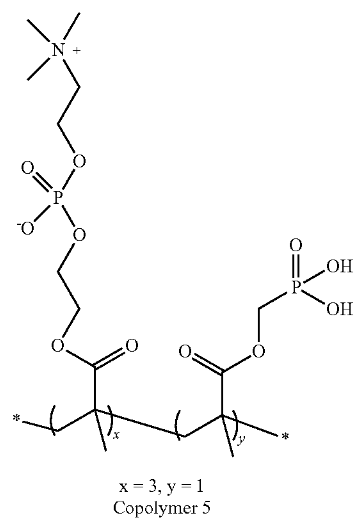

x = 3, y = 1
Copolymer 5

-continued

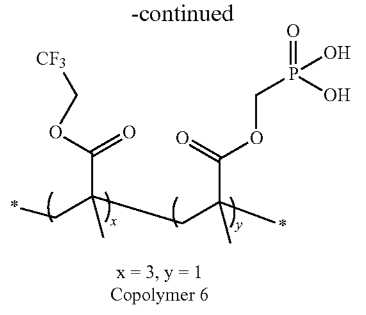

x = 3, y = 1
Copolymer 6

Copolymer 5: Poly(2-methacryloyloxyethyl phosphorylcholine)-co-(methacryloyloxymethyl phosphonic acid). The polymerization was performed using monomers MPC and MMPA in a stoichiometric ratio of 3.0/1.0 with 5 mol % V-501 as the initiator. MPC (300 mg, 1.02 mmol), 61 mg MMPA (0.339 mmol), 19 mg V-501 (0.068 mmol), and 0.8 mL methanol were added to a Schlenk flask equipped with a magnetic stir bar. The flask was sealed and deoxygenated by purging with argon for 15 minutes, followed by bubbling argon through the solution for 5 minutes. The flask was placed in a preheated oil bath at 70° C. and the mixture was stirred at 400 rpm for 72 hours. Copolymer 5 was obtained by precipitation into acetone.

Copolymer 6: Poly(2,2,2-trifluoroethyl methacrylate)-co-(methacryloyloxymethylphosphonic acid). The polymerization was performed using monomers TFEMA and MMPA in a stoichiometric ratio of 3.0/1.0 with 5 mol % V-501 as the initiator. TFEMA (300 mg, 1.78 mmol), 107 mg MMPA (0.595 mmol), 33.3 mg V-501 (0.119 mmol), and 0.8 mL methanol were added to a Schlenk flask equipped with a magnetic stir bar. The flask was sealed and deoxygenated by purging with argon for 15 minutes, followed by bubbling argon through the solution for 5 minutes. The flask was placed in a preheated oil bath at 70° C. and the mixture was stirred at 400 rpm for 72 hours. Copolymer 6 was obtained by precipitation into n-hexane.

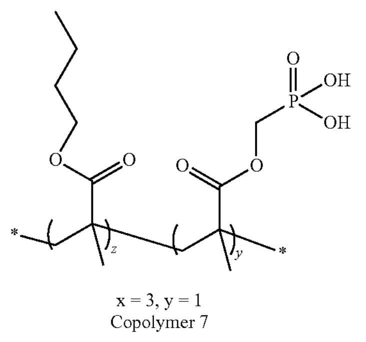

x = 3, y = 1
Copolymer 7

Copolymer 7: Poly(butyl methacrylate)-co-(methacryloyloxymethylphosphonic acid). The polymerization was performed using monomers BMA and MMPA in a stoichiometric ratio of 3.0/1.0 with 5 mol % V-501 as the initiator. BMA (300 mg, 2.10 mmol), 126.7 mg MMPA (0.703 mmol), 39.3 mg V-501 (0.140 mmol), 0.4 mL isopropanol, and 0.6 mL methanol were added to a Schlenk flask equipped with a magnetic stir bar. The flask was sealed and deoxygenated by purging with argon for 15 minutes, followed by bubbling argon through the solution for 5 minutes. The flask was placed in a preheated oil bath at 70° C. and the mixture was stirred at 400 rpm for 72 hours. Copolymer 7 was obtained by precipitation into methanol/water (1:1, v/v).

Example 2: Coating Metal Products with the Pretreatment Solution

Analytical Instruments and Methods:

Water contact angle measurements. Water contact angles were determined using a DataPhysics OCA 35 water contact angle measurement system (Dataphysics, San Jose, CA, USA). Water droplets and lubricant droplets (1 μL each) were deposited on substrates and equilibrated for 10 seconds. Contact angles were calculated from the drop shapes using the Young-Laplace equation.

Ellipsometric analysis of dry film thicknesses. Dry film thicknesses were determined using a variable angle spectroscopic ellipsometer (Semilab SE2000, Semilab ZRt, Budapest, Hungary). Ellipsometric data were recorded at incidence angles of 65°, 70°, and 75° using a wavelength range of 245 nm-990 nm. The ellipsometric data, angles Y' and A, were analyzed using the software provided with the instrument (Spectroscopic Ellipsometry Analyzer v1.6.1 (Semilab)). The calculation method was based on a five-layer silicon/silicon oxide/aluminum oxide/polymer brush/ambient environment model, assuming the polymer brush layer to be isotropic and homogeneous. The refractive index (n) of the polymer brush layer was approximated by the Cauchy approximation ($n=A_n+B_n/\lambda^2$) and was fitted with the layer thickness by the software. All reported ellipsometric film thicknesses on silicon wafers are corrected for the approx. 1.5 nm-thick native oxide layer on the silicon substrates and 10 nm aluminum oxide layer grown by atomic layer deposition (ALD).

Atomic force microscopy (AFM). AFM imaging was carried out on a Cypher VRS platform (Asylum Research, Oxford Instruments, Oxford, United Kingdom) in tapping mode (AC Air topography) mode using HQ-NSC18/A1 BS silicon cantilevers (resonance frequency f=60-90 kHz, force constant k=1.2-5.5 N/m). The oscillation of the cantilever was driven by photothermal excitation. The analyzed area was 2 μm×2 μm using a 2.5 Hz scanning rate.

Frictional analysis by nanotribometer. TTX, STEP-NTR3 instrument (Nano Tribometer, Anton Paar GmbH, Graz, Austria) together with either ST-S (maximum normal and friction loads, $F_n$, $F_t$=100 mN) or HL-S (maximum $F_n$, $F_t$=1 N) cantilevers were used for friction measurements. The nanotribology tests were performed on polymer coated silicon/alumina wafers using 2 mm diameter steel 100Cr6 balls at 1, 10, 100 (using an ST-S cantilever), and 300 mN (using an HL-S cantilever) loads. Sliding distance was 2 mm at 0.8 Hz (maximum linear speed 5 mm/s) over 500 cycles. No additional lubricant was used.

Coating Procedures:

Spin coating was performed to evaluate graft copolymer coatings applied to aluminum oxide layers on silicon wafers as model substrates. Spin coating substrates (e.g., aluminum oxide-coated silicon wafers, or wafers) were sonicated in acetone and isopropanol for 5 minutes each. Then, the wafers were rinsed with isopropanol and blow-dried with argon. Subsequently, the wafers were placed in an oxygen plasma generator energized to 92 W under a 10 mL/min oxygen flow for 5 minutes. The cleaned wafers were spin-coated with 10 μL of a 2 wt. %, 5 wt. %, and 10 wt. % aqueous solutions of homopolymer 2a. Spin coating was performed for 5 minutes at 1000 rpm and 2000 rpm, and for 1 minute at 4000 rpm and 8000 rpm to evaluate the spin coating characteristics. The coated wafers were then placed on a heating stage preheated to 70° C. and dried for 2 hours. The samples were stored under ambient atmosphere and analyzed by water contact angle measurements and spectroscopic ellipsometry. The thickness of the 2 wt. % spin-cast solution ranged from 5-15 nm, the thickness of the 5 wt. % spin-cast solution ranged from 20-55 nm, and the thickness of the 10 wt. % spin-cast solution ranged from 35-95 nm. Ellipsometric measurements were performed within one week after coating.

FIG. 1 is a graph showing dry polymer film thickness as a function of spin-coating speed (referred to as "w" in FIG. 1 in rpm) for three solutions of homopolymer 2a in water at concentrations of 2 wt. %, 5 wt. %, and 10 wt. %. The film thicknesses scale well with the theoretical dependence indicated by the dashed line (i.e., film thickness is proportional to the inverse square-root of the spin speed, $d=A\cdot w^{(-1/2)}$, where d is the film thickness, w is the spin speed, and A is the spin duration).

Figure 2:
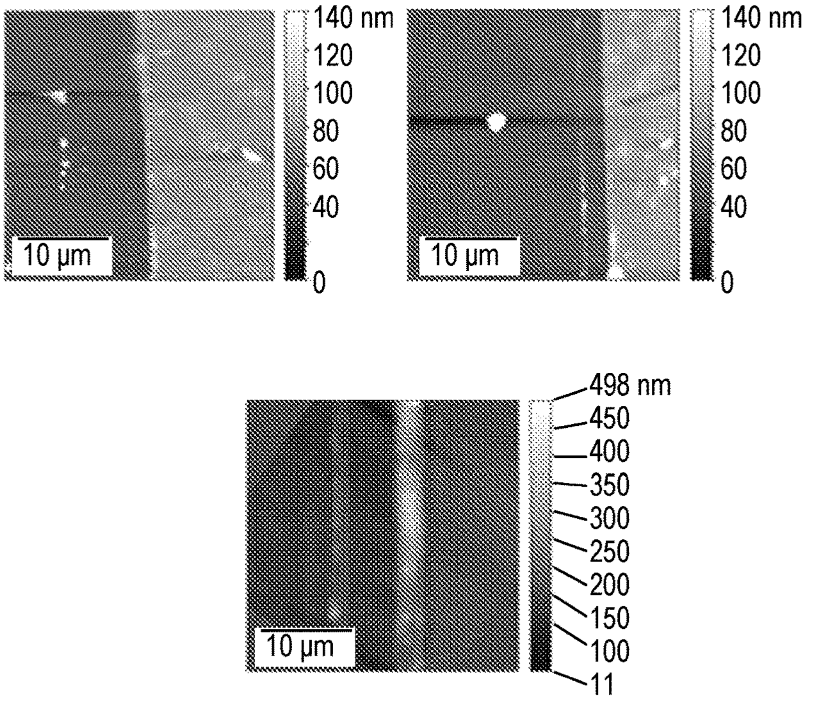
FIG. 2 shows atomic force microscopy (AFM) images of spin-coated thin films according to an example described herein.
Figure 3:
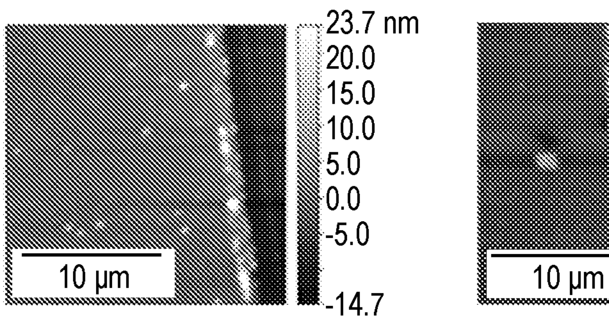
FIG. 3 shows atomic force microscopy (AFM) images of spin-coated and washed thin films according to an example described herein.
Figure 3:
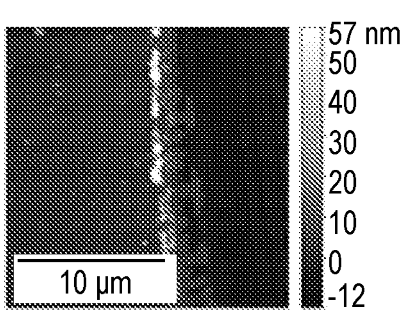

Copolymers 3j, 3k, and 3l were spin-coated onto aluminum oxide layers on silicon wafers to evaluate film thickness. Wafers cleaned as described above were spin-coated with 10 μL of a 2 wt % aqueous solution of copolymers 3j, 3k, and 3l for 5 minutes at 2000 rpm, and for 1 minute at 4000 rpm and 8000 rpm. The coated wafers were then placed on a heating stage preheated to 70° C. and dried for 2 hours. The samples were stored under ambient atmosphere and analyzed by water contact angle measurements, spectroscopic ellipsometry, and atomic force microscopy. The thickness of the spin-cast solution at 2000 rpm ranged from 5.3 nm-8.2 nm, at 4000 rpm ranged from 14.9 nm-48.3 nm, and at 8000 rpm ranged from 15.2 nm-35.9 nm. These values were similar to the values obtained from atomic force microscopy step analysis in which part of copolymer coating was removed by scratching with a sharp steel needle (see FIG. 2 and FIG. 3). FIG. 2 shows AFM images of substrates spin-coated with 2 wt. % aqueous solution of copolymer 3j. The cross-sections indicate from 33.7 nm-43.6 nm copolymer coating. FIG. 3 shows AFM images of substrates spin-coated with 2 wt. % aqueous solution of copolymer 3j and subsequently washed with water. The cross-sections indicate from 8.8 nm-9.3 nm thick copolymer coating.

Copolymers 3a, 4, 5, 6, and 7 were spin-coated onto aluminum oxide layers on silicon wafers to evaluate film thickness. Cleaned wafers were spin-coated with 50 μL of a 2 wt. % aqueous solution of polymer 3a, 4, 5, 6, and 7 for 1 min at 8000 rpm. The coated wafers were then placed on a heating stage preheated to 70° C. and dried for 10 minutes. The samples were stored under ambient atmosphere and polymer coating thickness was evaluated by spectroscopic ellipsometry as shown in Table 1 below:

TABLE 1

| Polymer coating | Thickness (nm) |
| --- | --- |
| Copolymer 3a | 27.5 ± 3.0 |
| Copolymer 4 | 24.5 ± 2.8 |
| Copolymer 5 | 29.96 ± 0.85 |
| Copolymer 6 | 56.1 ± 2.1 |
| Copolymer 7 | 70.72 ± 0.36 |

Additionally, copolymers 3a, 4, 5, 6, and 7 were spin-coated onto cleaned aluminum oxide layers on silicon wafers for 1 min at 8000 rpm. The coated wafers were then placed on a heating stage preheated to 70° C. and dried for 10 minutes. Then, the samples were immersed for 15 minutes in either water (copolymers 3a, 4, and 5) or isopropanol (copolymers 6 and 7), followed by rinsing with their respective solvent, then with isopropanol, and blow-dried with argon. The samples were stored under ambient atmosphere and film thickness was evaluated by spectroscopic ellipsometry as shown in Table 2 below:

TABLE 2

| Polymer coating | Thickness (nm) |
| --- | --- |
| Copolymer 3a | 9.66 ± 0.25 |
| Copolymer 4 | 5.13 ± 0.40 |
| Copolymer 5 | 7.22 ± 0.62 |
| Copolymer 6 | 7.4 ± 1.5 |
| Copolymer 7 | 3.99 ± 0.28 |

Figure 4:
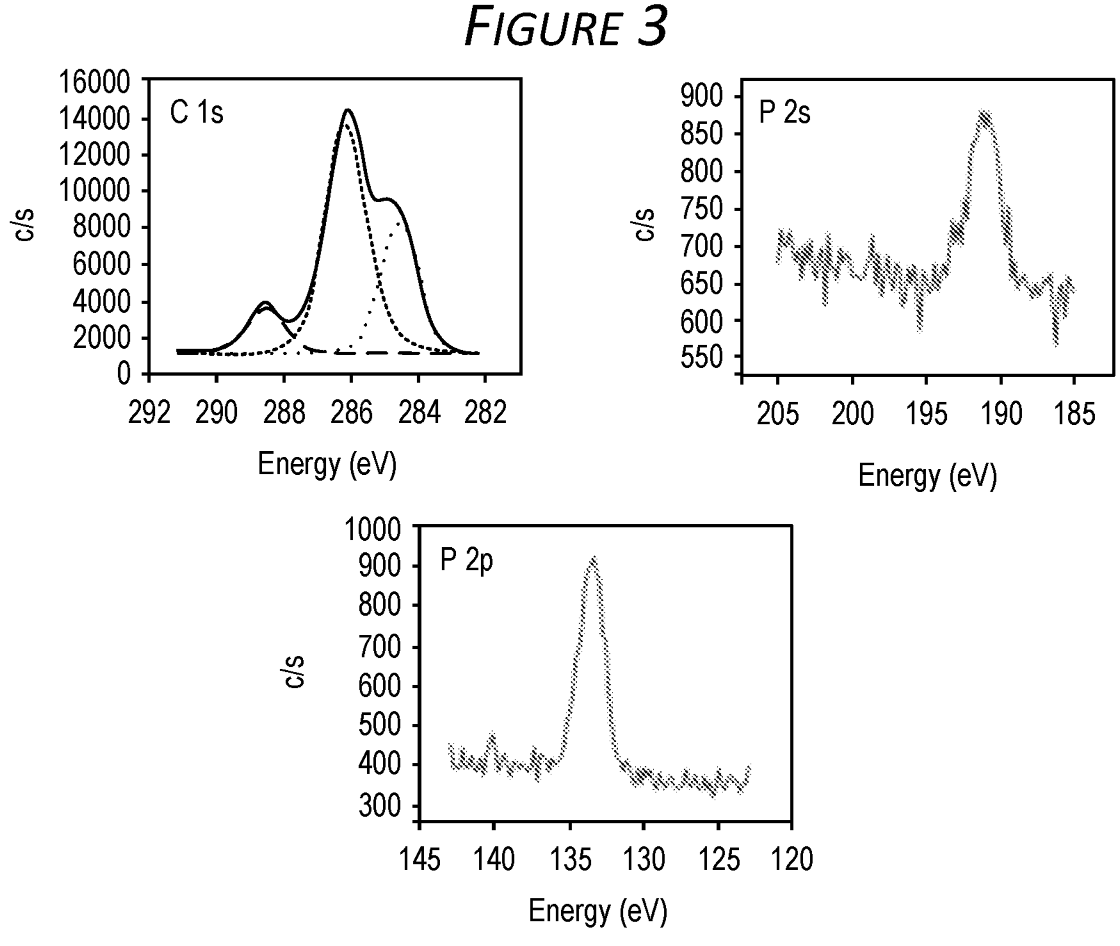
FIGS. 4-6 show X-ray photoelectron spectroscopy (XPS) scans of thin films according to an example described herein.
Figures 5, 6:
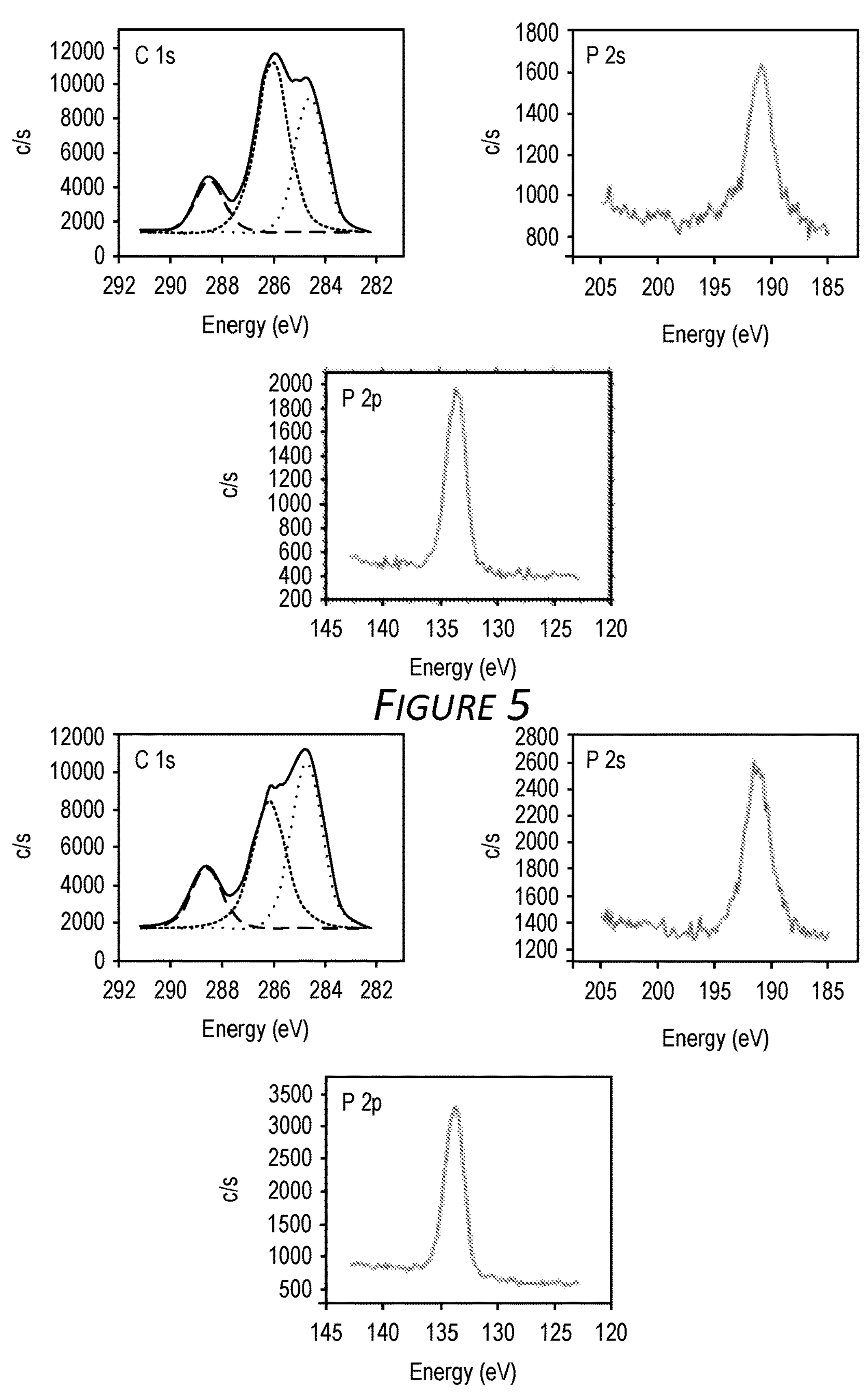

Copolymers 3a, 3b and 3c spin-coated onto aluminum oxide layers on silicon wafers were analyzed by X-ray photoelectron spectroscopy (XPS) with C 1s, P 2s and P 2p high resolution scans to confirm presence of copolymers. FIGS. 4-6 show X-ray photoelectron spectroscopy scans of copolymer 3a (FIG. 4), copolymer 3b (FIG. 5) and copolymer 3c (FIG. 6) films. Deconvoluted C 1s scans (left graph in each of FIGS. 4-6) indicate presence of aliphatic carbon atoms (signal at 285 eV), carbon atoms in PEG chains (signal at 286.3 eV) and carbonyl atoms belonging to methacrylate group of the polymer backbone (signal at 289 eV). Phosphorous scans show peaks at 191 eV in P 2s scan and at 134 eV in P 2p scan. The intensity of phosphorus scans both in the P 2s region (center graph in each of FIGS. 4-6) and P 2p region (right graph in each of FIGS. 4-6) scale well with the increasing amount of phosphonic acid within the copolymer samples (i.e., the P signal for copolymer 3b is doubled compared to copolymer 3a, and the P signal for copolymer 3c is tripled compared to copolymer 3a).

Copolymer 3h was spin-coated onto aluminum oxide layers on silicon wafers to evaluate the film thickness of polymer gel layers. Wafers cleaned as described above were spin-coated with 40 μL of a 2 wt. % solution of copolymers 3h in a 9:1 methanol-water mixture for 1 minute at 2500, 5000, 7000 and 8000 rpm. Subsequently, the silicon wafers were incubated in a 5 mM solution of zirconium bis(acetylacetonate) in ethanol for one hour. The zirconium ions crosslink the phosphonic acid functionalities in the copolymer and a polymer gel layer is formed. After rinsing with ethanol, the silicon wafers were spin-dried at 8000 rpm for 30 seconds. Resulting film thicknesses determined by ellipsometry were 58.6±1.9 nm for 2500 rpm, 42.5±1.2 for 5000 rpm, 38.8±1.4 nm for 7000 rpm and 38.1±1.4 for 8000 rpm respectively.

Figure 7:
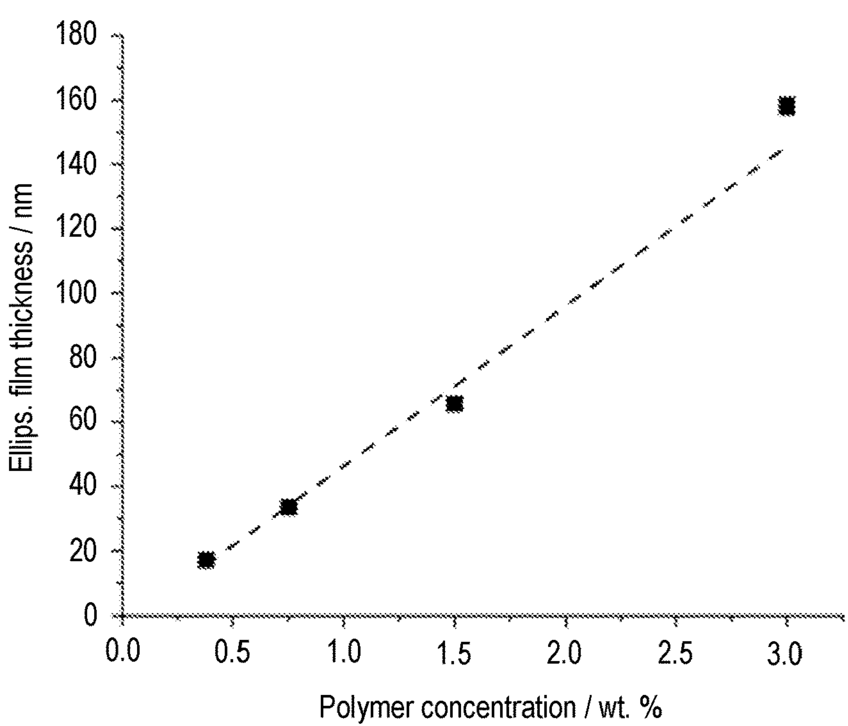
FIG. 7 shows the film thickness of spin-coated samples of a crosslinked polymer film according to an example described herein.
Figure 8:
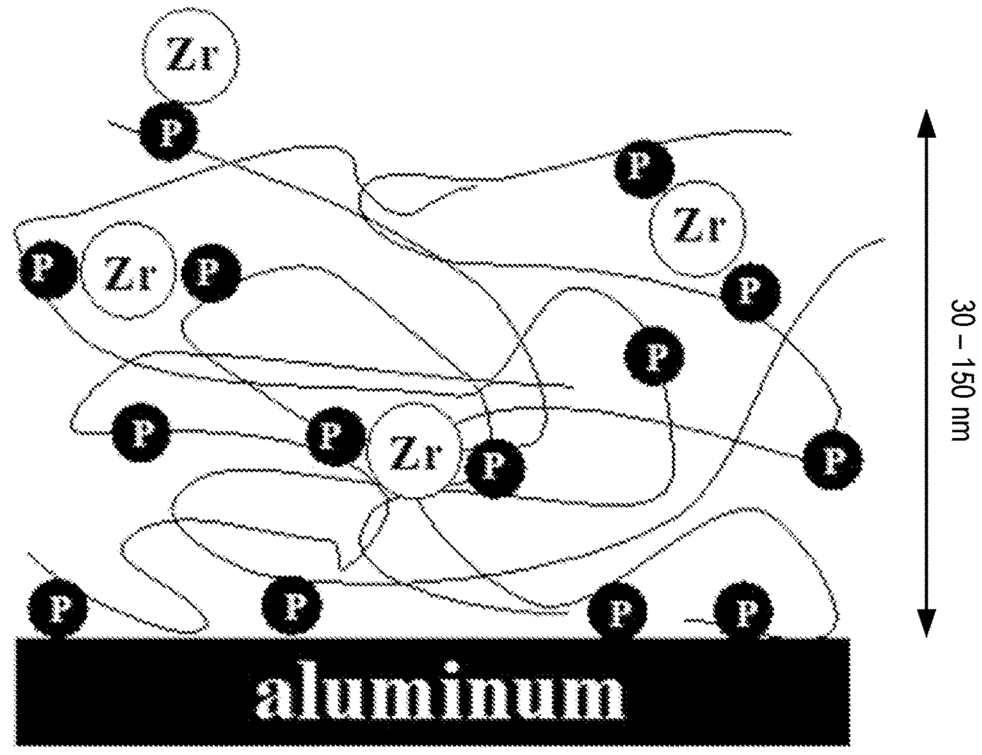
FIG. 8 is a schematic showing a crosslinked graft copolymer layer applied to an aluminum surface forming a polymer gel, with Zr as a crosslinking agent for phosphonic acid groups according to an example described herein.
Figure 9:
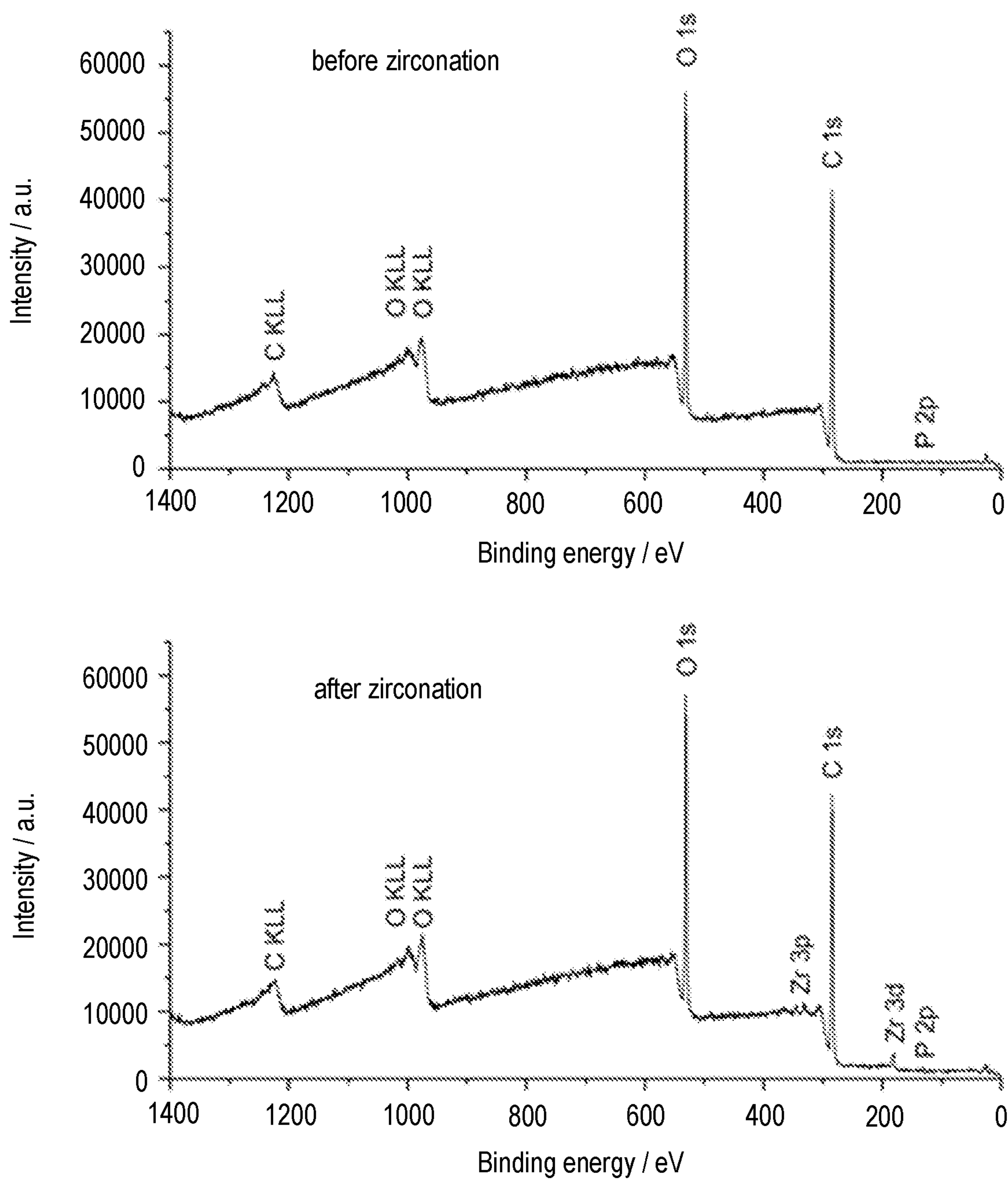
FIG. 9 shows X-ray photoelectron spectroscopy (XPS) scans of thin films before and after crosslinking according to an example described herein.

Copolymer 3h was spin-coated onto aluminum oxide layers on silicon wafers and 5754 aluminum samples pretreated with EDT, a tetrahydroacridine derivative, (e.g., 5754 EDT aluminum) at 8000 rpm for one minute as described above. The thickness of the polymer layer was controlled by varying the polymer concentration in the spin coating solution, ranging from 0.38 wt % to 3.0 wt % in a methanol-water mixture (9:1). After spin coating, the samples were incubated for 1 hour in a 5 mM solution of zirconium bis(acetylacetonate) in ethanol for crosslinking. Samples were rinsed with ethanol and spin-dried at 8000 rpm for 10 seconds. FIG. 7 and Table 3 show how the gel layer thickness correlates with the polymer concentration in the spin coating step. The thickness of the polymer gel layer can be controlled by the polymer concentration in the spin coating step. FIG. 8 is a schematic representation of the polymer gel layer. FIG. 9 and Table 4 show the XPS data before (FIG. 9, top panel) and after (FIG. 9, bottom panel)

cosslinking (referred to as "zirconation" in FIG. 9), indicating the presence of the zirconium crosslinks.

TABLE 3

| Concentration of polymer solution (wt %) | Thickness (nm) |
|---|---|
| 0.38 | 17.0 ± 0.5 |
| 0.75 | 33.6 ± 0.3 |
| 1.5 | 65.7 ± 1.6 |
| 3.0 | 158.2 ± 2.8 |

TABLE 4

| | Atomic concentration (%) | | | |
|---|---|---|---|---|
| | C1s | O1s | P2p | Zr3d |
| Before zirconation | 67.7 | 31.9 | 0.35 | 0 |
| After zirconation | 65.6 | 33.2 | 0.55 | 0.50 |

Figure 10:
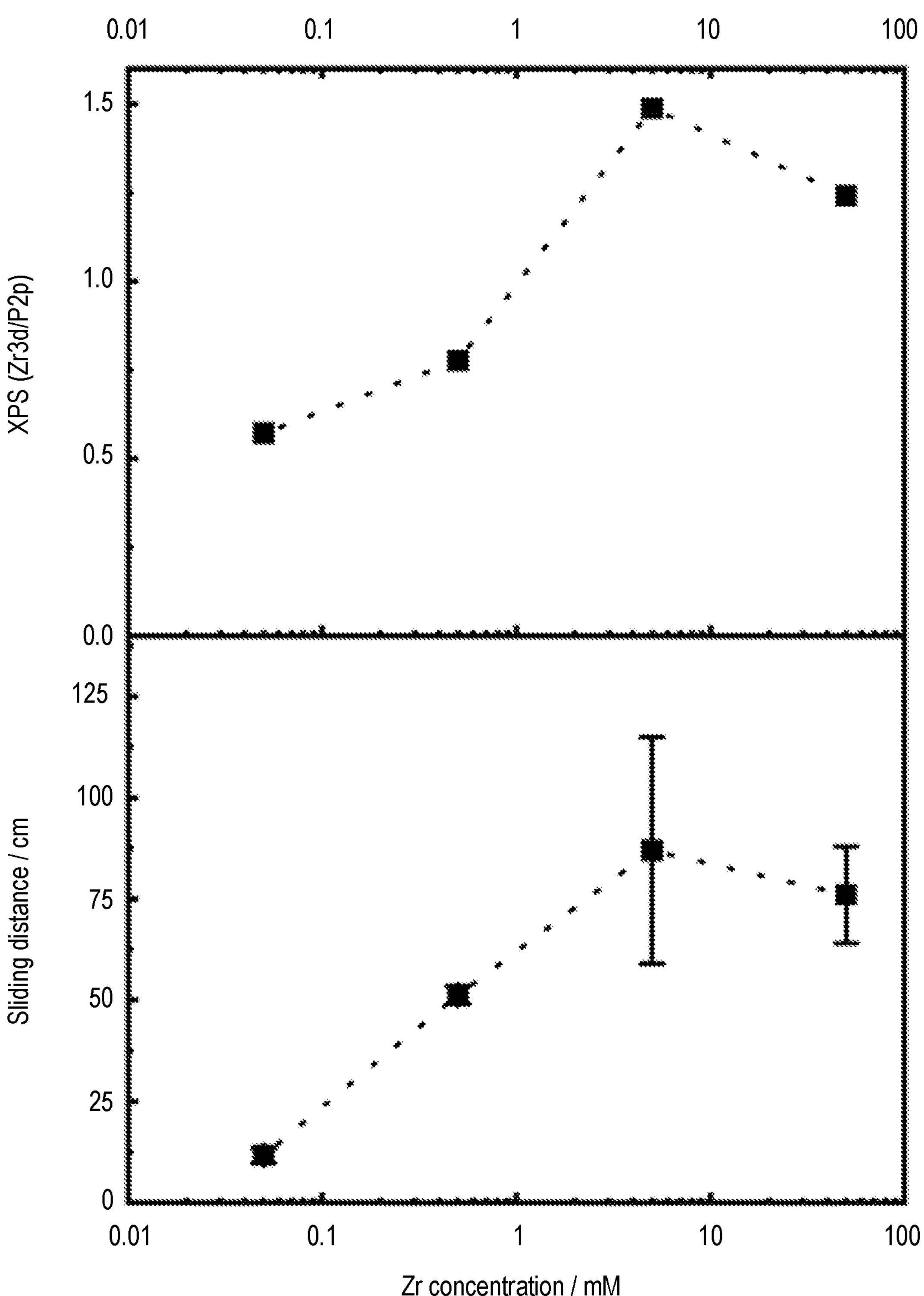
FIGS. 10-11 show the zirconium content determined by XPS and the corresponding tribological performance according to an example described herein.
Figure 11:
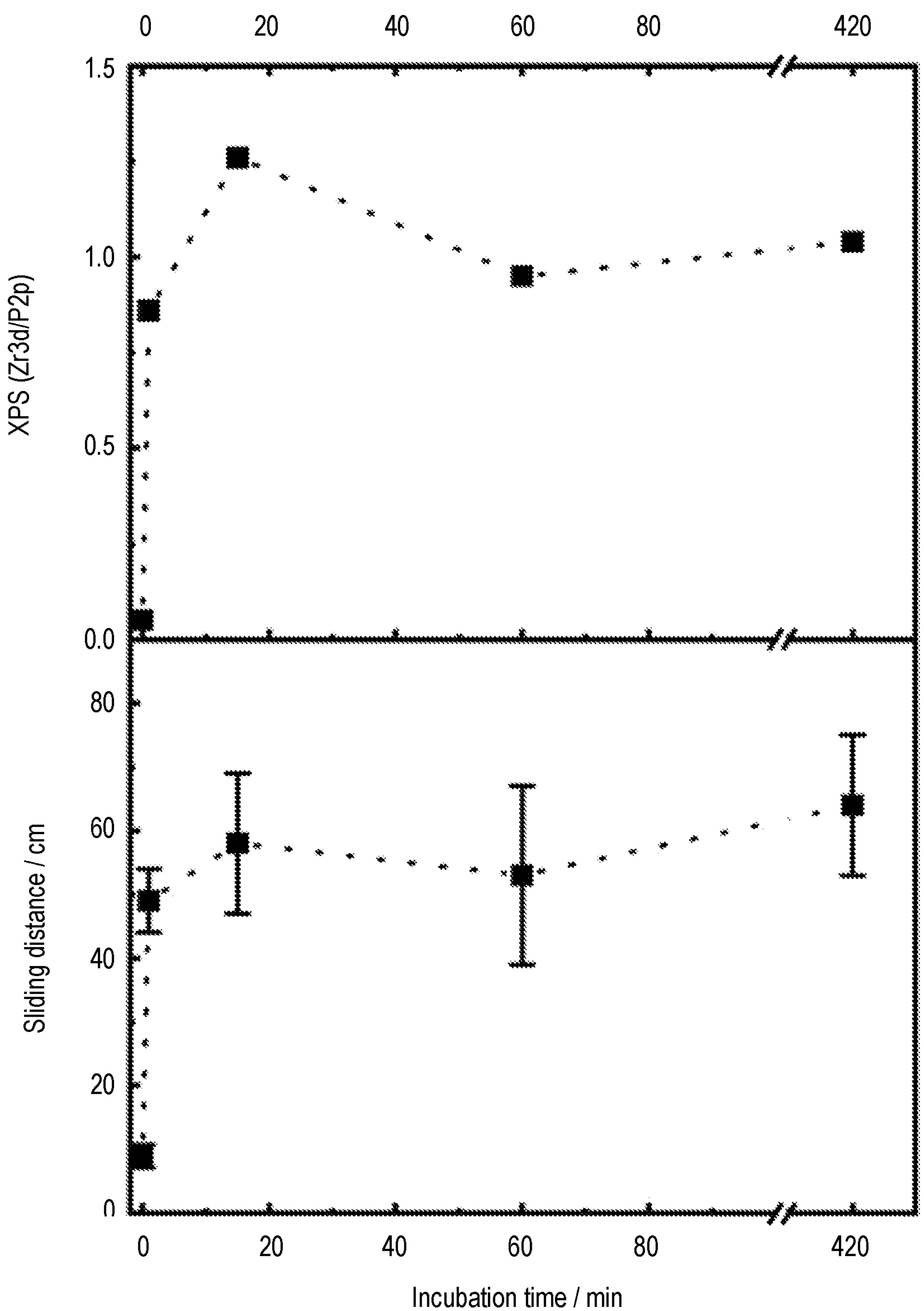

Crosslinking of a spin-coated layer of copolymer 3h by zirconium ions is typically achieved by incubation up to 15 minutes at concentrations in a millimolar range at room temperature. For zirconium concentrations in the sub-millimolar range, the thickness of the polymer gel layer decreases significantly after rinsing, indicating that no sufficient degree of crosslinking is achieved to form a structurally stable polymer gel layer. The decrease in polymer gel layer thickness is also reflected by reduced sliding distance in nanotribology experiments. Higher concentrations do not further improve the stability of the polymer gel layer (FIG. 10 and Table 5). After incubation for 1 minute in a 5 mM zirconium bis(acetylacetonate) ($Zr(acac)_4$) solution in ethanol at room temperature, a stable polymer gel layer is formed. XPS data implies that crosslinking is complete after a maximum of 15 minutes (FIG. 11 and Table 6). No significant increase in the zirconium content was observed for longer incubation times. For comparative samples that were not crosslinked, a significant reduction in the polymer layer thickness is observed after rinsing, indicating that without crosslinking zirconium ions, a substantial amount of the polymer is removed from the surface during the rinsing step.

TABLE 5

| $Zr(acac)_4$ concentration (mM) | Thickness (nm) | XPS (Zr3d/P2p) |
|---|---|---|
| 0 | 9.0 ± 1.8 | 0 |
| 0.05 | 16.5 ± 0.3 | 0.57 |
| 0.5 | 29 ± 5 | 0.78 |
| 5 | 151 ± 4 | 1.49 |
| 50 | 166 ± 3 | 1.24 |

TABLE 6

| Incubation time (min) | Thickness (nm) | XPS (Zr3d/P2p) |
|---|---|---|
| 0 | 15.3 ± 0.4 | 0.05 |
| 1 | 131.5 ± 1.8 | 0.86 |
| 15 | 135 ± 3 | 1.26 |
| 60 | 129.3 ± 2.1 | 0.95 |
| 420 | 125.9 ± 2.3 | 1.04 |

Figure 19:
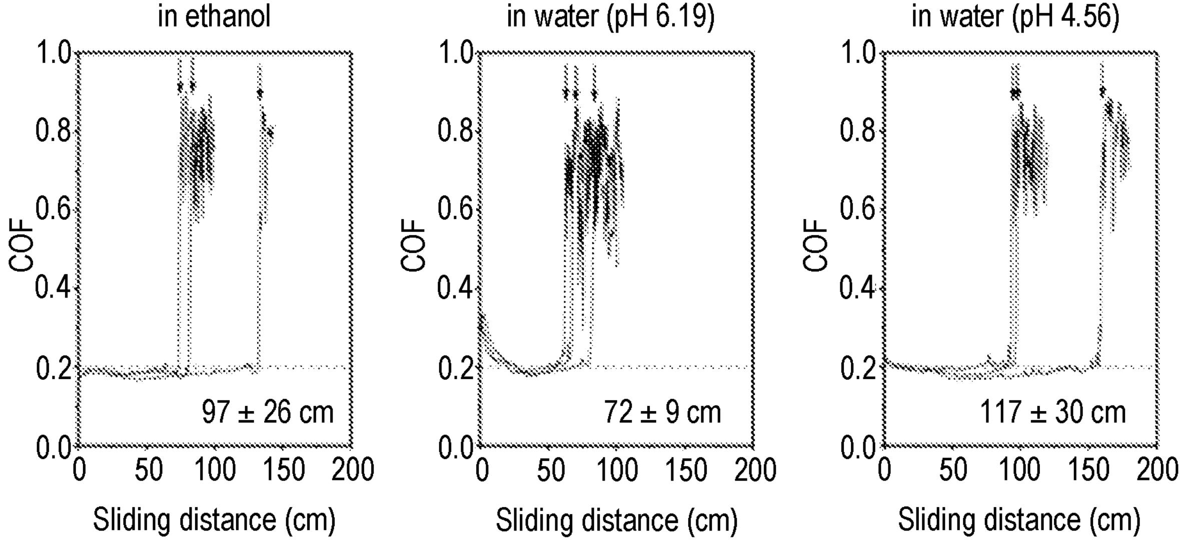
Figure 20:
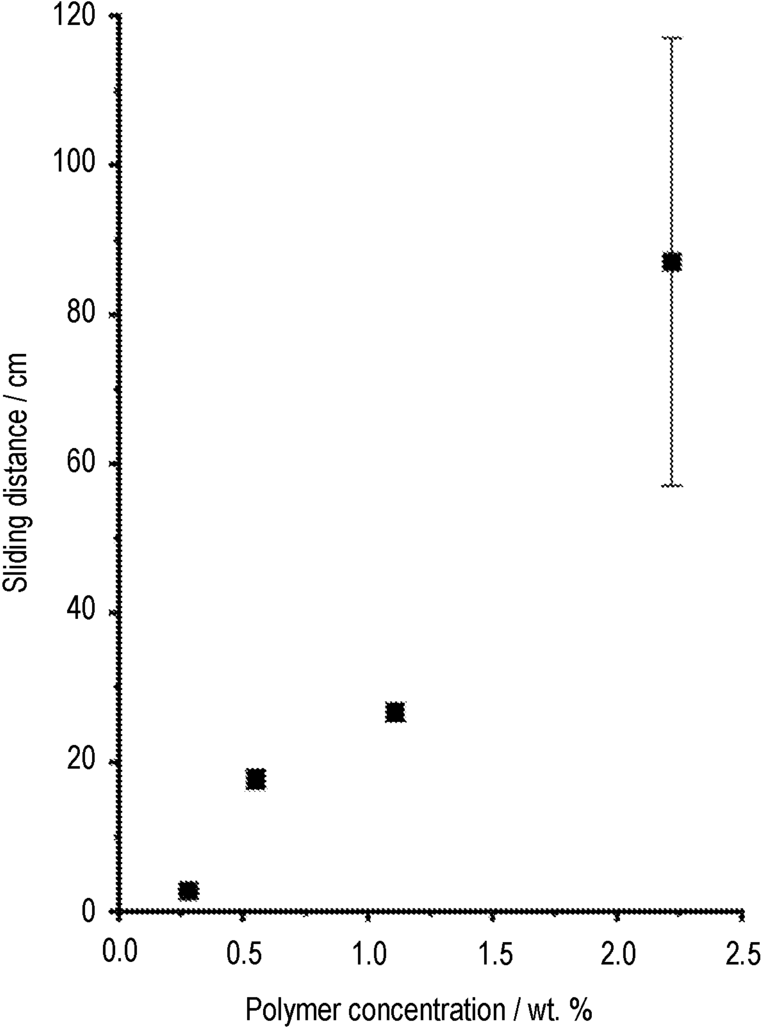
FIGS. 20-22 show the tribological performance of polymer gel layers in dependence of the amount of applied polymer according to an example described herein.

Crosslinking with zirconium bis(acetylacetonate) can also be achieved by immersion in aqueous solutions. FIG. 19 shows the tribological performance with a force of 300 mN normal load of a polymer gel layer prepared by crosslinking a spin-coated 239 nm copolymer 3h layer on 5457 EDT aluminum in 5 mM solution of zirconium bis(acetylacetonate) in ethanol in water at pH 6.19 and in a slightly acidic aqueous solution with pH 4.56 respectively. In the latter solution, the pH was reduced by adding a small amount sulfuric acid. The lower pH facilitates the solubility and stability of zirconium bis(acetylacetonate) in aqueous solutions, which is shown by the enhanced tribological performance of the corresponding polymer gel modified surface. Decomposition products may form precipitates on the surface and lead to an increased initial coefficient of friction and a reduced sliding distance as seen for the polymer gel prepared in water at pH 6.19. Application from aqueous solutions is an important factor for environmental and economic aspects.

Example 3: Coating Properties

Figure 12:
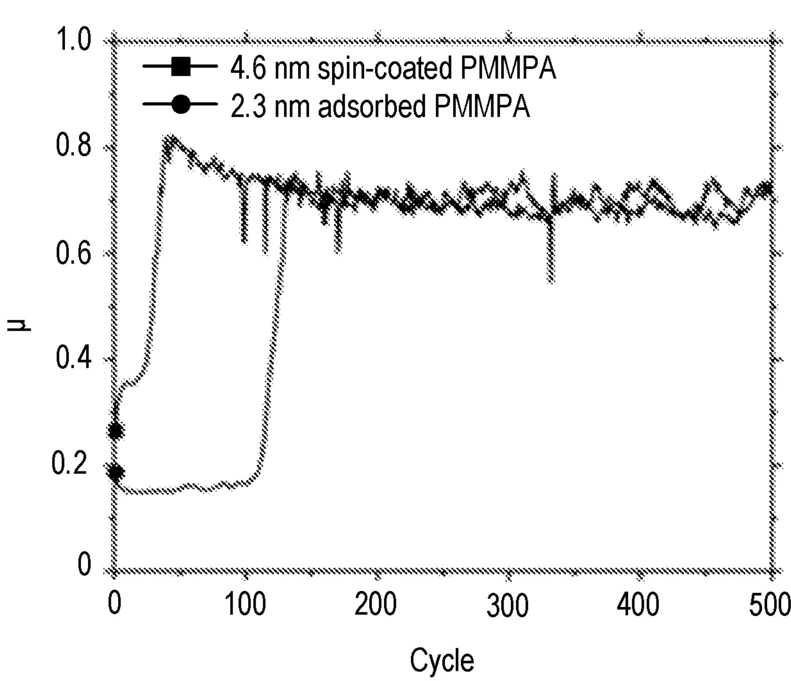
FIGS. 12-19 are graphs showing the coefficient of friction on thin films by cyclic testing according to an example described herein.
Figure 13:
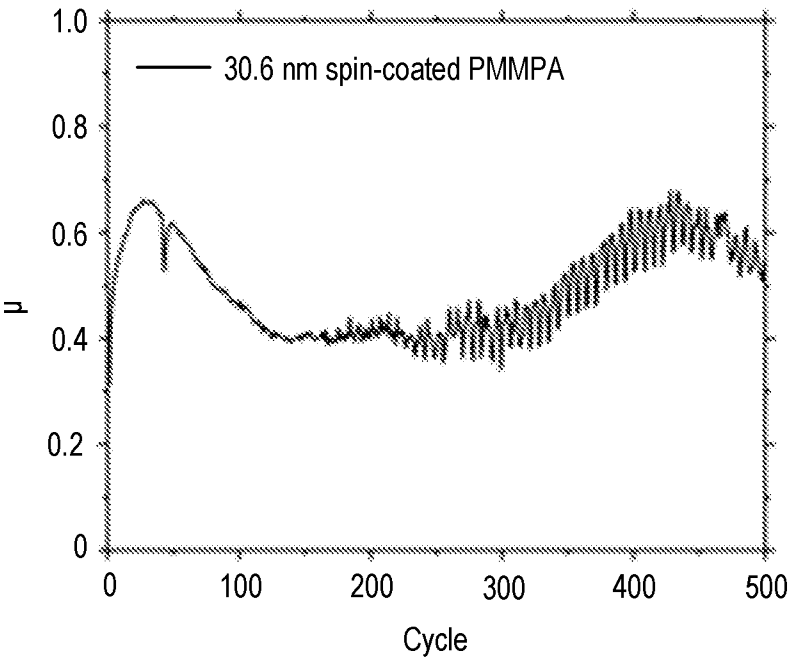
Figure 14:
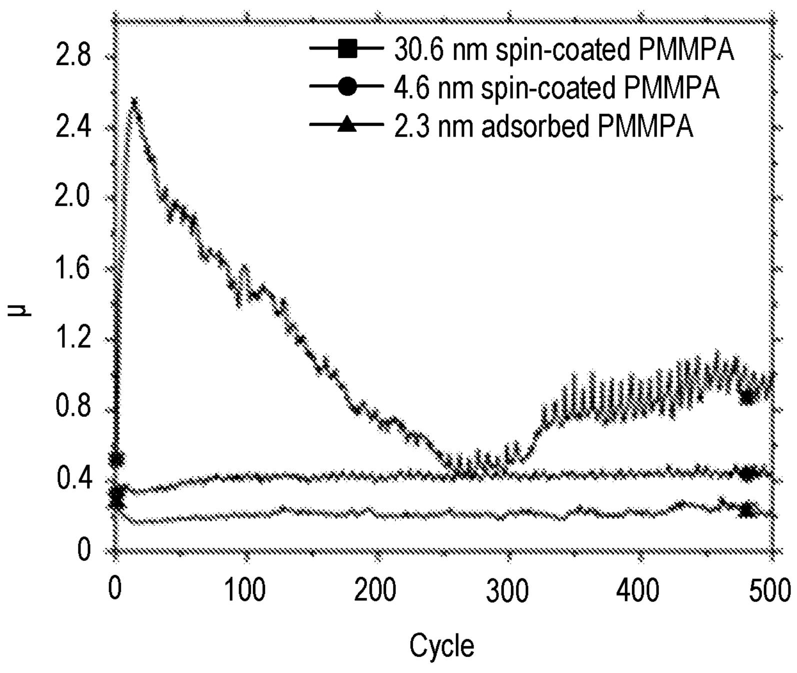

Homopolymer 2a films were analyzed by nanotribology to determine the coefficient of friction of the coated surface. The nanotribology tests were performed on aluminum oxide layers on silicon wafers coated with homopolymer 2a using the methods described above. The nanotribological tests were performed under forces of 100 mN, 10 mN, and 1 mN. FIG. 12 shows the nanotribology results for wafers coated with a 4.6 nm thick film and a 2.3 nm thick film. The 4.6 nm thick film and the 2.3 nm thick film were tested under a 100 mN force for 500 cycles. As shown in FIG. 12, both the 4.6 nm thick film and the 2.3 nm thick film provided a coefficient of friction (u) of about 0.7 and were constant over the 500 cycles. FIG. 13 shows the nanotribology results for wafers coated with a 30.6 nm thick film. The 30.6 nm thick film was tested under 10 mN of force for 500 cycles. As shown in FIG. 13, the 30.6 nm thick film provided an unstable coefficient of friction over 500 cycles. FIG. 14 is a graph comparing the nanotribology results for wafers coated with a 30.6 nm thick film, a 4.6 nm thick film, and a 2.3 nm thick film. The 30.6 nm thick film, 4.6 nm thick film, and 2.3 nm thick film were tested under a 1 mN force for 500 cycles. The 4.6 nm thick film and the 2.3 nm thick film exhibited lower coefficients of friction and more stability compared to the thicker 30.6 nm film. As shown in FIG. 14, both the 4.6 nm thick film and the 2.3 nm thick film provided a coefficient of friction of less than about $\mu$=0.4 and were constant over the 500 cycles, and the 30.6 nm thick film provided a higher and unstable coefficient of friction over 500 cycles.

Figure 17:
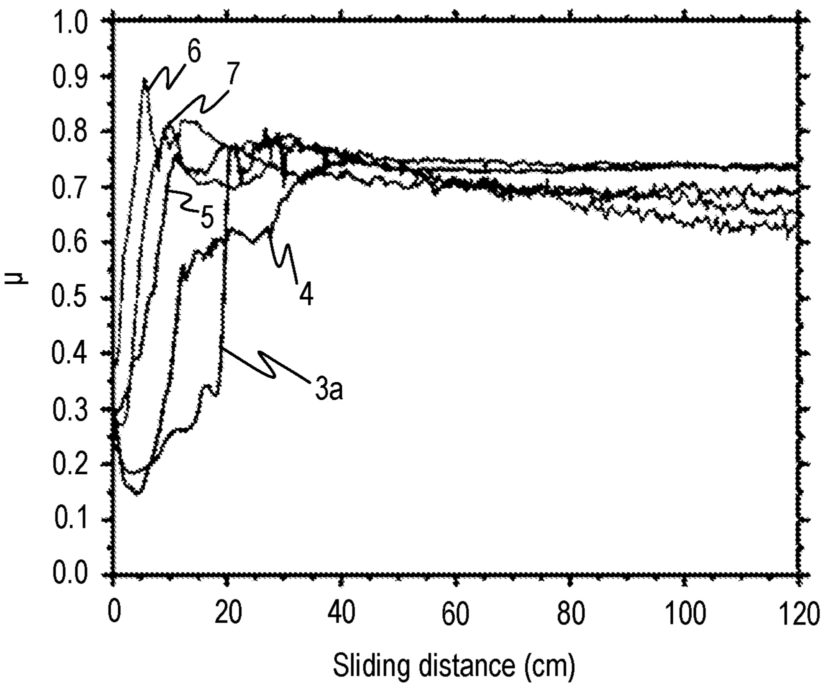
Figure 18:
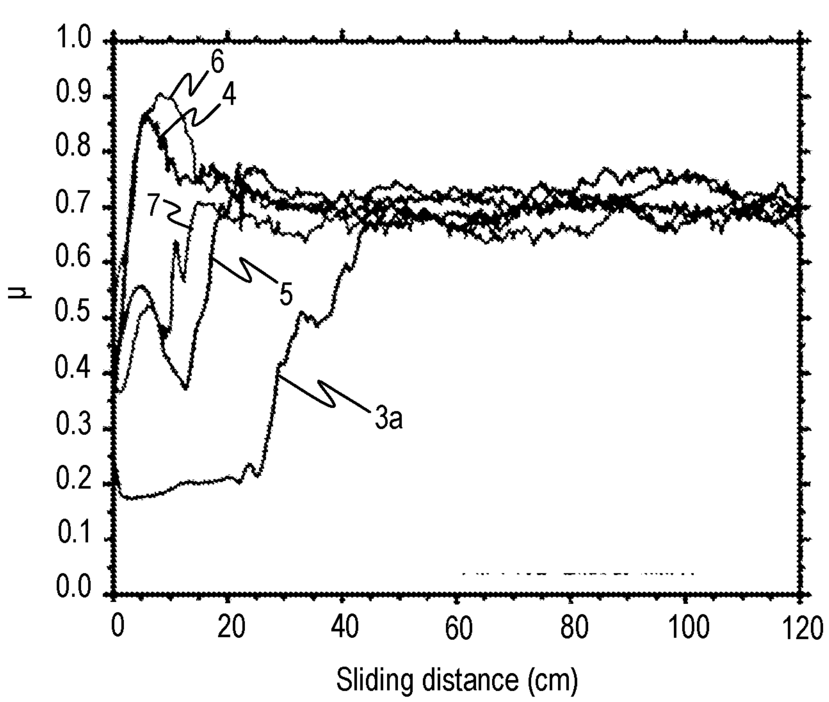

Copolymer 3a, 4, 5, 6 and 7 films were analyzed by nanotribology to determine the coefficient of friction of the coated surface and maximum sliding distance of the initial coefficient of friction. The nanotribology tests were performed on aluminum oxide layers on silicon wafers coated with copolymer 3a, copolymer 4, copolymer 5, copolymer 6, and copolymer 7 using the methods described above. The nanotribological tests were performed under forces of 300 mN (FIG. 15 and FIG. 17) and 100 mN (FIG. 16 and FIG. 18). All of these tests show initially low coefficients of friction of the surfaces followed by a rapid increase, indicating a mechanical damage of the coatings.

Figure 15:
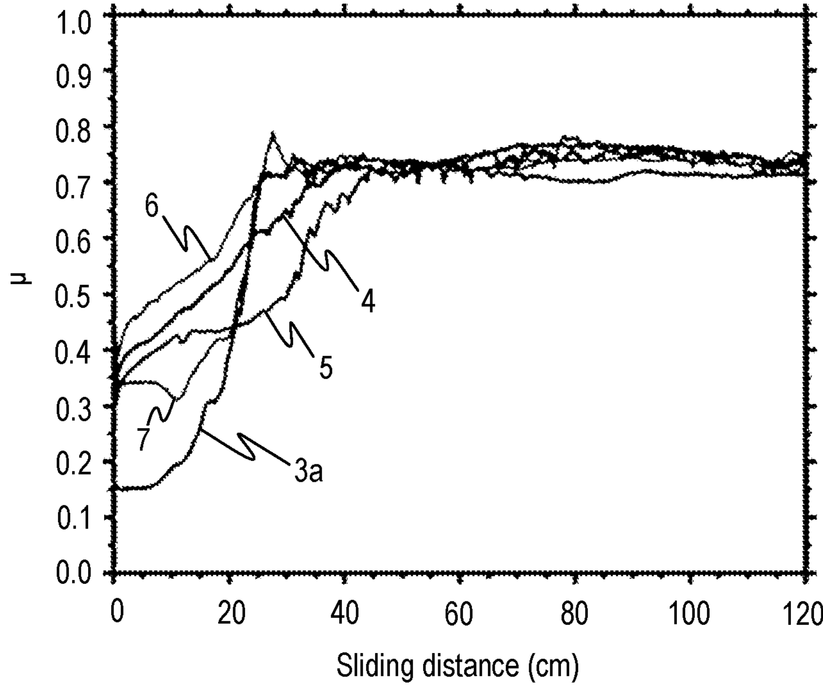
Figure 16:
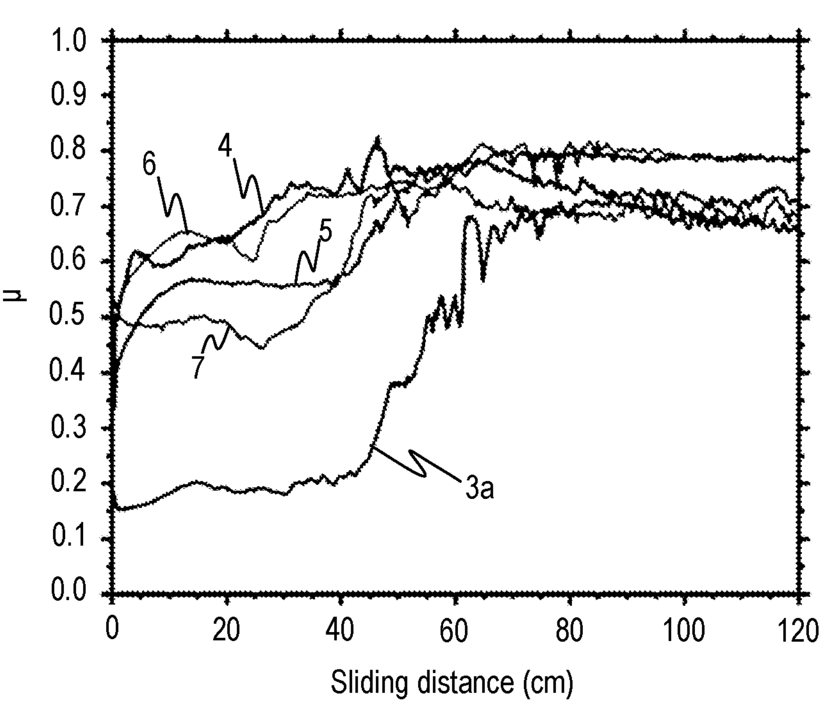

FIGS. 15 and 16 show performance of spin-coated films with thicknesses from 24 nm-71 nm. FIGS. 17 and 18 show performance of spin-coated films with thicknesses from 24 nm-71 nm that were further subjected to a washing step to remove unbound and/or excess copolymer material. Under both forces of 300 mN and 100 mN, the films comprising copolymer 3a show lower initial coefficients of friction of 0.15 for the test carried out under 300 mN, and 0.2 for the test carried out under 100 mN normal load. Similarly, the copolymer 3a films maintain their lowest coefficient of friction for longer sliding distances of 43 cm for the test carried out under 100 mN, and 10 cm for the test carried out under 300 mN load for spin-coated films. These results indicate a surprisingly good performance of the copolymers described herein, given the film thickness on the order of nanometers and the absence of any additional lubricant. Films comprising copolymers that do not have grafted PEG chains showed a consistently worse performance. After washing excess copolymer, the tests (see FIGS. 17 and 18) show a negligible effect on the lowest coefficients of frictions. At 100 mN test (see FIG. 17) the maximum sliding distance is reduced from 43 cm to about 23 cm for the copolymer 3a film. In contrast, at 300 mN test (see FIG. 18) this distance is not reduced. Surprisingly, at 300 mN thicker coatings seem to play very little role and the performance is determined only by the more firmly attached layer.

Figure 24:
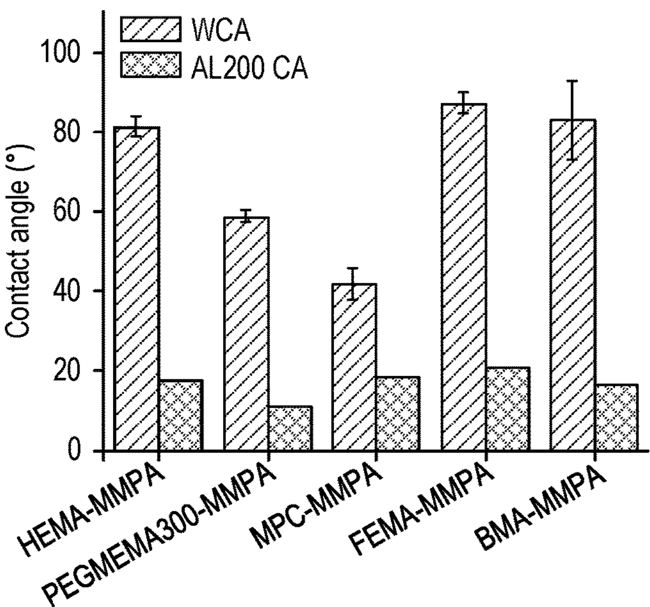
FIG. 24 is a graph showing water and lubricant contact angles of thin films according to an example described herein.

Water contact angle (referred to as "WCA" in FIG. 24) and lubricant AL200 contact angle (referred to as "AL200 CA" in FIG. 24) measurements of copolymer 3a (referred to as "PEGMEMA300-MMPA" in FIG. 24), 4 (referred to as "HEMA-MMPA" in FIG. 24), 5 (referred to as "MPC-MMPA" in FIG. 24), 6 (referred to as "FEMA-MMPA" in FIG. 24), and 7 (referred to as "BMA-MMPA" in FIG. 24) films were measured, and their comparison is shown in FIG. 24. The water contact angle for copolymer 3a was approximately 60°. A water contact angle of approximately 42° was observed for copolymer 5, which includes highly polar zwitterionic comonomer constituents.

Figure 25:
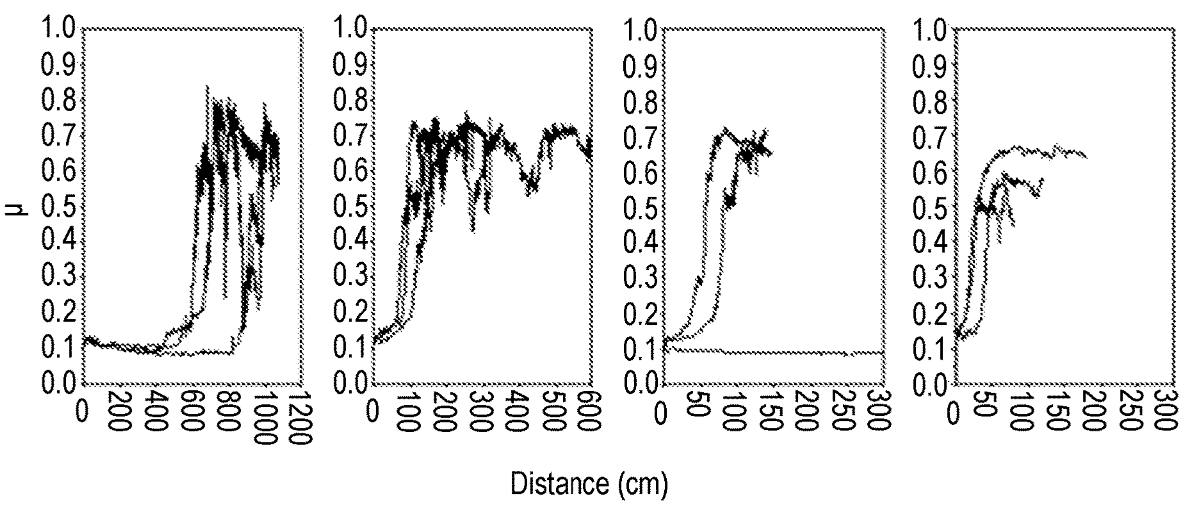
FIGS. 25-26 are graphs showing the coefficient of friction of lubricated samples by cyclic testing according to an example described herein.
Figure 26:
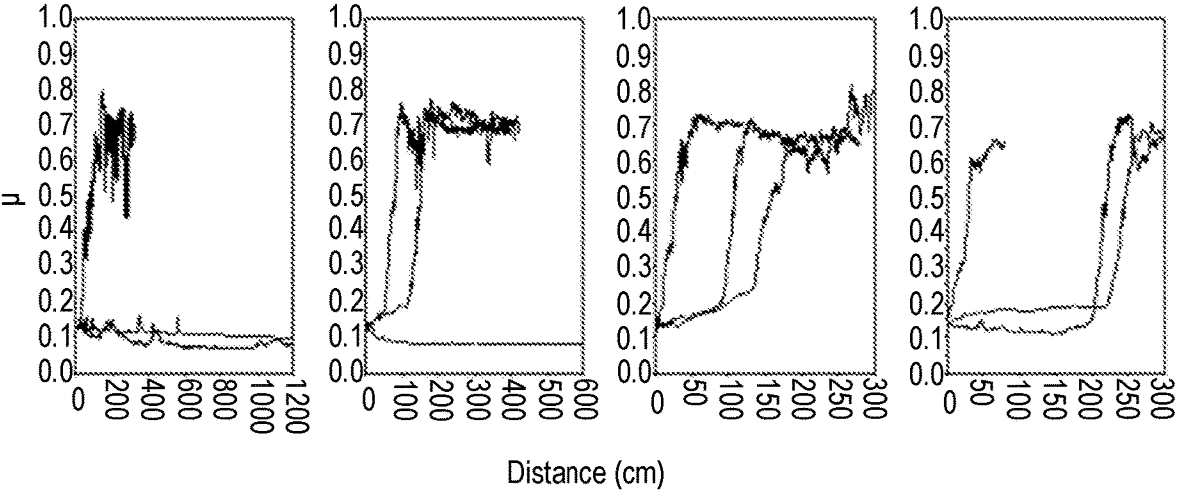

Copolymer 3a films with 9.66 nm coating were lubricated with AL200 by spin-coating with 1 wt. % isopropanol solution of AL200 for 1 min at 8000 rpm. The thickness of lubricated surfaces was about 54 nm, as evaluated by spectroscopic ellipsometry. Additionally, a reference substrate that was not coated with a polymer was lubricated in a similar way. The lubricated samples were analyzed by nanotribology to determine the coefficient of friction and maximum sliding distance of the initial coefficient of friction of the coated surfaces (see FIG. 25 and FIG. 26). The nanotribological tests were performed under forces of 100 mN (left graph in each of FIG. 25 and FIG. 26), 300 mN (second from the left graph in each of FIG. 25 and FIG. 26), 600 mN (third from the left graph in each of FIG. 25 and FIG. 26), and 1000 mN (right graph in each of FIG. 25 and FIG. 26). For all of the samples, the initial coefficient of friction is about 0.1. After a certain sliding distance, this coefficient of friction rapidly increases to about 0.7, which indicates removal of the AL200 lubricant. This maximum sliding distance at low a coefficient of friction is generally much higher for copolymer 3a films. For example, at 100 mN, the sliding distance is increased from 600-800 cm to more than 1200 cm; for 300 mN, there is an increase from 100 cm to more than 600 cm, for 600 mN no increase was observed; for 1000 mN an increase from 0-50 cm to 200-230 cm is observed.

Copolymer 3a, 3b, 3c, 3d, 3e, 3h and 3k films were analyzed by nanotribology to systematically study the effect of chemical structure features, such as PEG chain length and the density of phosphonic acid anchor groups on the performance of the coatings. The nanotribological tests were performed under forces of 300 mN (FIGS. 27 and 29) and 100 mN (FIGS. 28 and 30).

Figure 27:
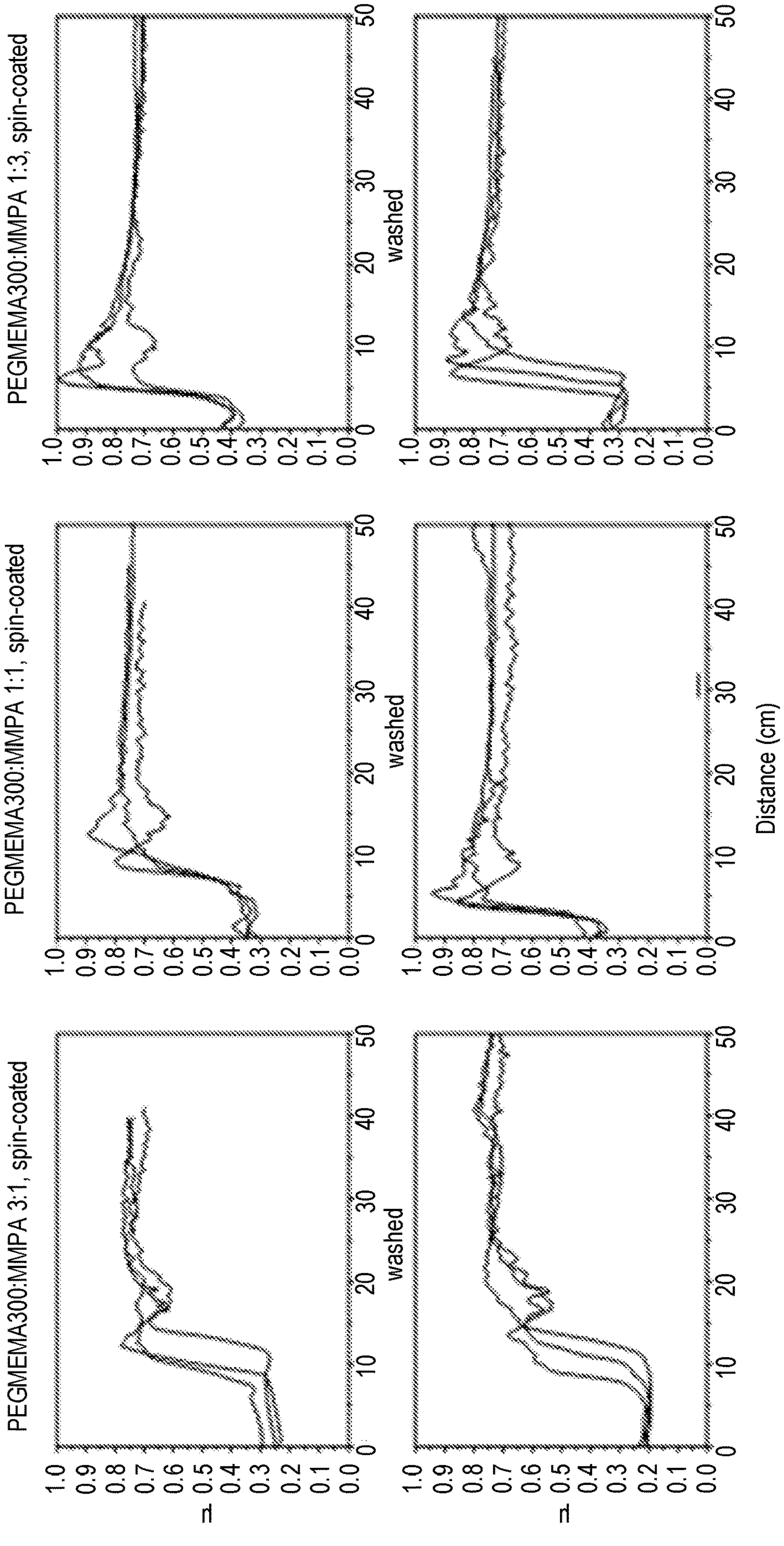
FIGS. 27-30 are graphs showing the coefficient of friction of thin films by cyclic testing according to an example described herein.
Figure 28:
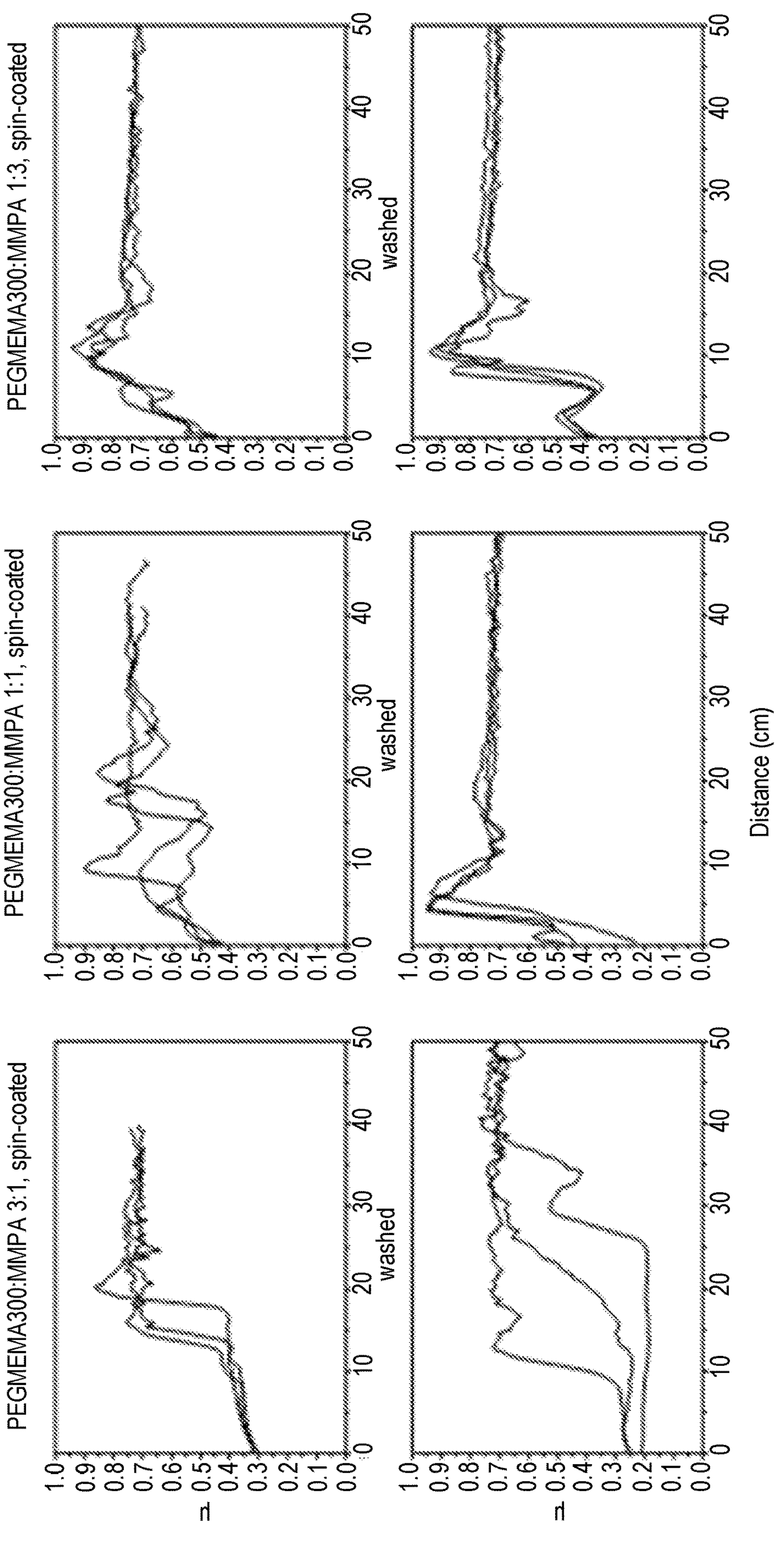

FIGS. 27 and 28 show tribological performance of copolymer 3a (left column in FIGS. 27-28), 3b (center column in FIGS. 27-28), and 3c (right column in FIGS. 27-28) films, which consist of copolymer chains synthesized using PEGMEMA-300 and an increasing amount of MMPA (at molar ratios of 3:1, 1:1 and 1:3). These films provided only moderate lubrication, as initial coefficients of friction of these substrates were above 0.3 for the tests under 100 mN normal loads. Moreover, the maximum sliding distances at these lower coefficients of frictions were mostly below 10 cm. Increasing the amount of binding phosphonic acid methacrylate within the copolymer chains did not improve these distances but rather deteriorated the performance, as the initial coefficients of friction were increasing from 0.3, for the lowest content of phosphonic acid, to 0.5 for the highest content of phosphonic acid. These effects were slightly lower during the tests under higher loads of 300 mN (e.g., the initial coefficients of friction increased from 0.2, for the lowest content of phosphonic acid, to 0.4 for the highest content of phosphonic acid, and the maximum sliding distances were only slightly affected).

Figure 29:
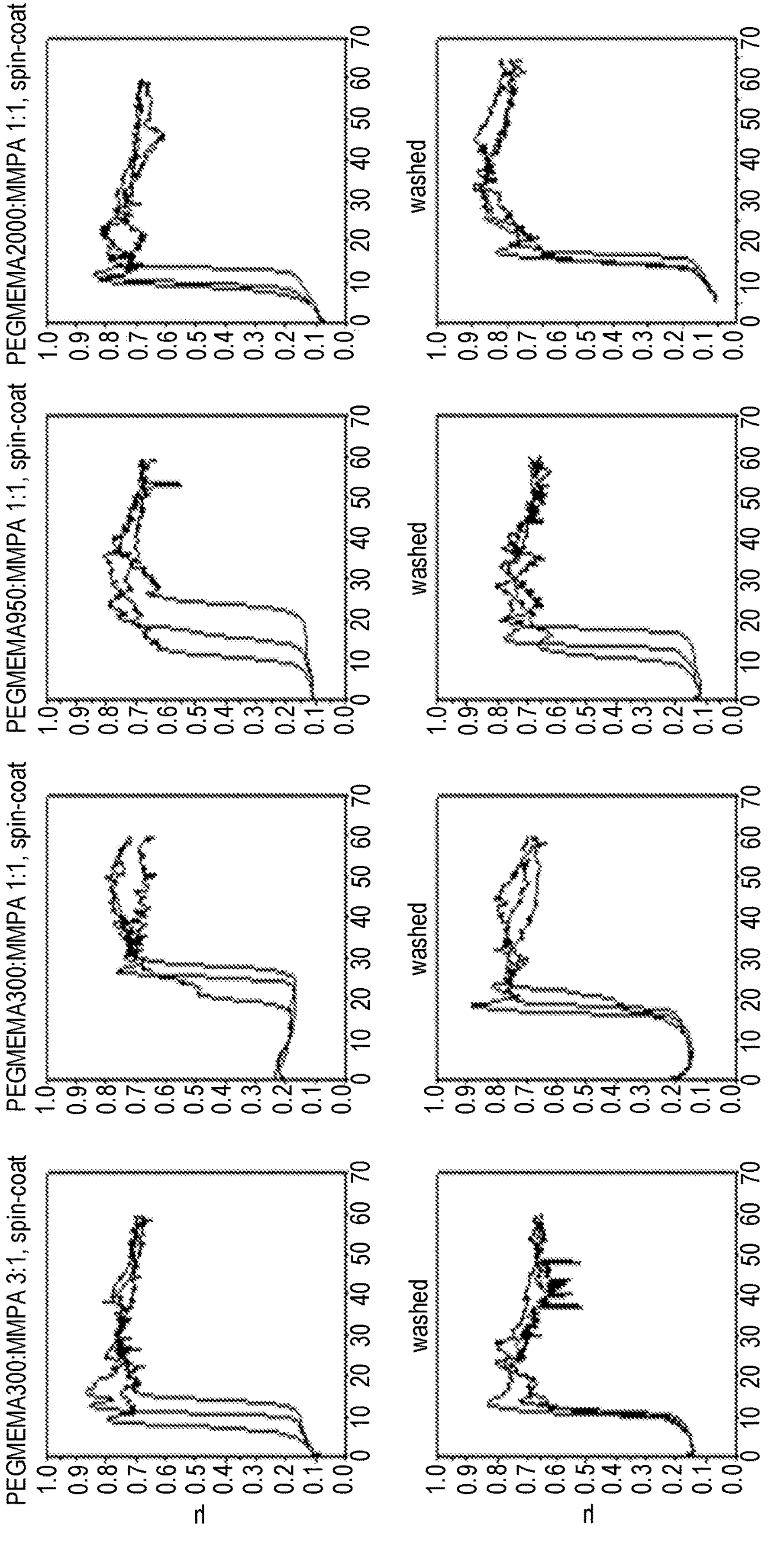
Figure 30:
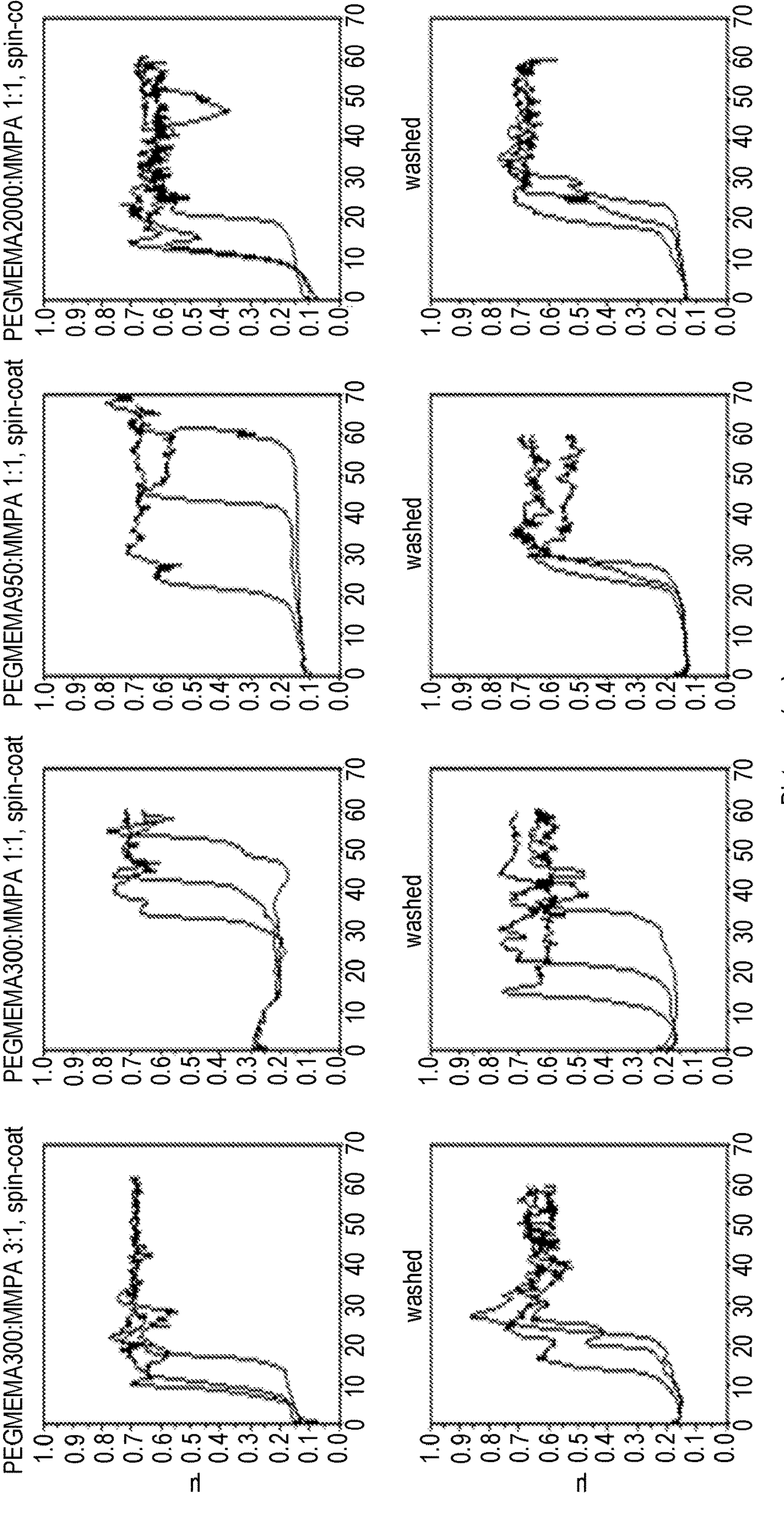

FIGS. 29 and 30 show tribological performance of copolymer 3d (left column in FIGS. 29-30), and 3e (second from left column in FIGS. 29-30), which were synthesized using monomers PEGMEMA-500 and MMPA (molar ratios of 3:1, and 1:1). Copolymers 3d and 3e surprisingly showed a clear improvement in maximum sliding distance at the initial coefficient of friction upon increasing amount of phosphonic acid anchor groups to 50 mol %. The maximum sliding distances increased from about 10 cm to 25 cm for spin-coated samples. Copolymer 3h (third from the left column in FIGS. 29-30), and 3k (right column in FIGS. 29-30), were synthesized using monomers PEGMEMA-950 and PEGMEMA-2000, respectively. Copolymer 3h films exhibited similar maximum sliding distance compared to copolymers 3d and 3e, but showed a lower initial coefficient of friction, 0.1, as compared to 0.2 for copolymer 3e films. Further increasing length of PEG chains does not lead to further improvements, as the initial coefficient of friction remains about 0.1 and the maximum sliding distance is lowered from 20 cm to 10 cm for the spin-coated samples.

Figure 21:
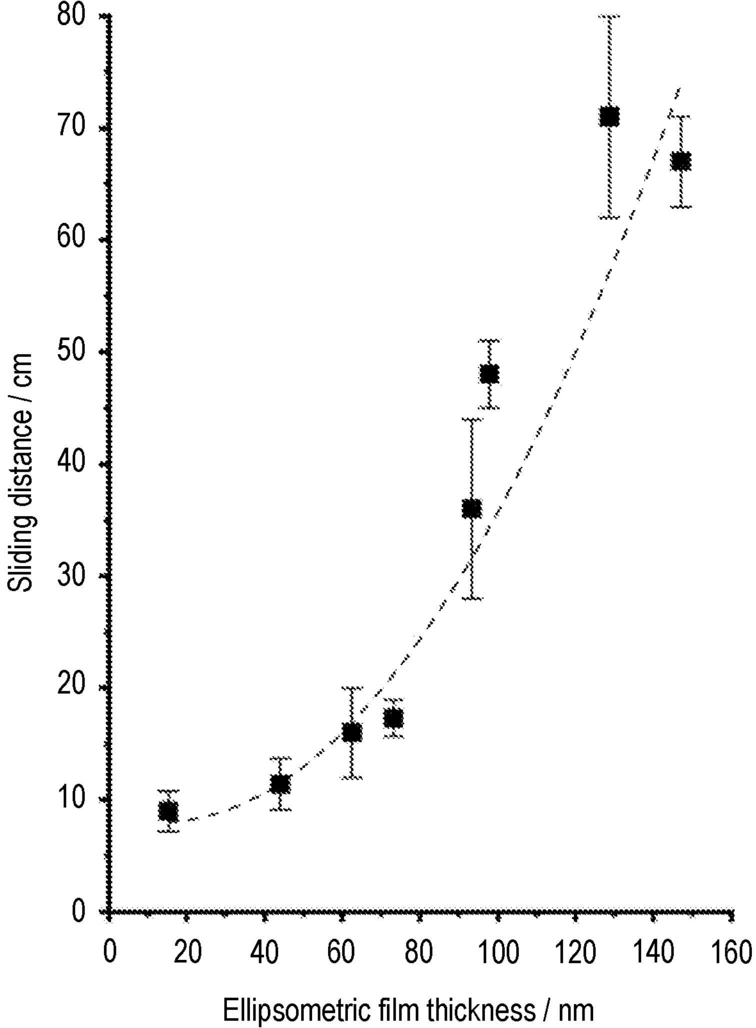

FIG. 21 shows the tribological performance of zirconium-crosslinked polymer gel films of copolymer 3 h with thicknesses applied by roll coating from aqueous polymer solutions. 5754 EDT aluminum sheets of the size 210×297 mm (A4) were coated. Sheets were dried at 35° C.' for 5 minutes and subsequently incubated in a solution of 5 mM zirconium bis(acetylacetonate) in ethanol for one hour at room temperature. Polymer concentrations of 2.22, 1.11, 0.55 and 0.28 wt % in water were employed, and zirconium-crosslinked polymer gel films of copolymer 3 h with thicknesses from 16.5 nm to 147 nm were achieved. The sheets were rinsed with ethanol and dried at room temperature, before conducting nanotribological measurements. A force of 300 mN normal load was applied to the films. This example demonstrates that application of the polymer is possible from aqueous solutions using techniques commonly used in large scale production. FIG. 21 shows the tribological performance under a 300 mN normal load. The films show initial coefficients of friction (COF, $\mu$) <0.2. Sliding distances range between 11.7 cm for the 16.5 nm thick polymer gel layer and 71 cm for the 128 nm thick polymer gel layer. These results indicate a good lubrication performance of the copolymer gels described herein, given a film thickness in the nanometer range and the absence of any additional lubricant.

Figure 23:
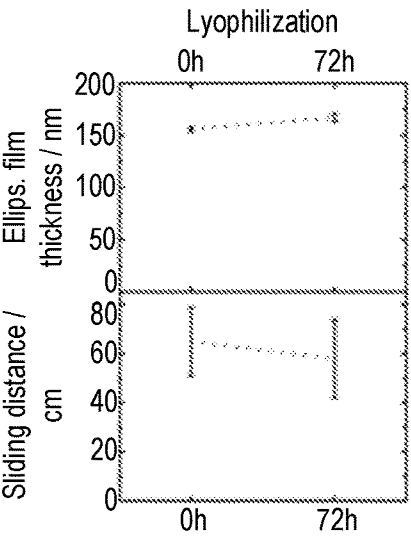
FIG. 23 shows film thickness determined by ellipsometry and tribological performance under different storage conditions according to an example described herein.
Figure 23:
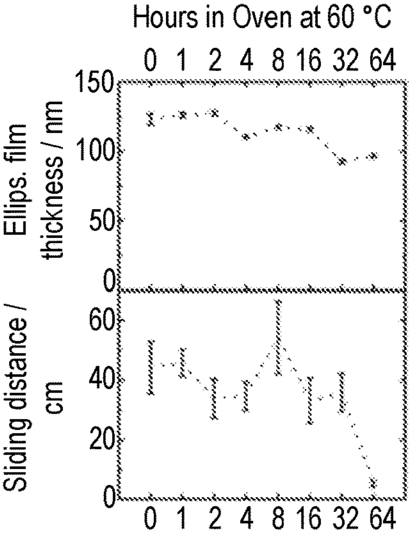
Figure 23:
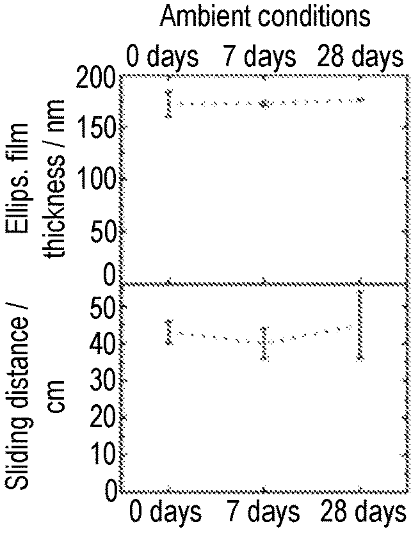

The storage stability of polymer gels prepared from copolymer 3h was investigated under the following conditions: up to 72 hours in a lyophilizer, up to 64 hours at 60° C. in an oven, and up to 1 month under ambient conditions (FIG. 23). The thickness of the polymer gel layer upon storage was monitored by ellipsometry using aluminum oxide coated silicon wafers as a substrate and tribological performance using 5754 EDT aluminum as a substrate applying a force of 300 mN normal load. Evident in FIG. 23, the tribological performance does not significantly decrease when stored under ambient conditions, and even high vacuum conditions in the lyophilizer for up to 72 did not impair the tribological performance. At elevated temperatures, e.g., when stored at 60° C. in an oven for 64 hours, tribological performance decreases after more than one hour of incubation. Lubrication properties fail after 64 hours of incubation. Samples were not remoistened or treated otherwise before tribological measurement. The presented data demonstrate the advantageous storage stability of the polymer gels.

Figure 22:
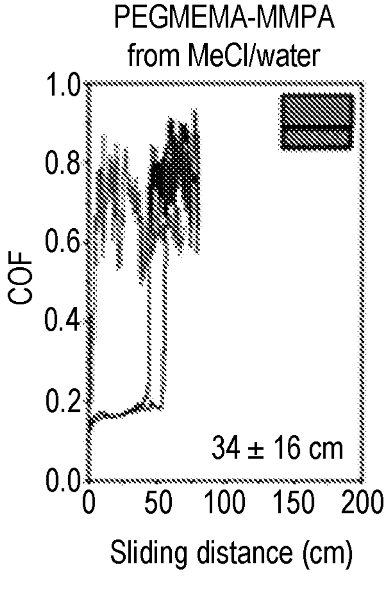
Figure 22:
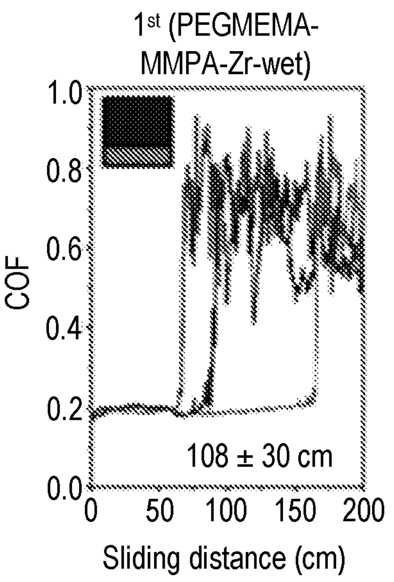
Figure 22:
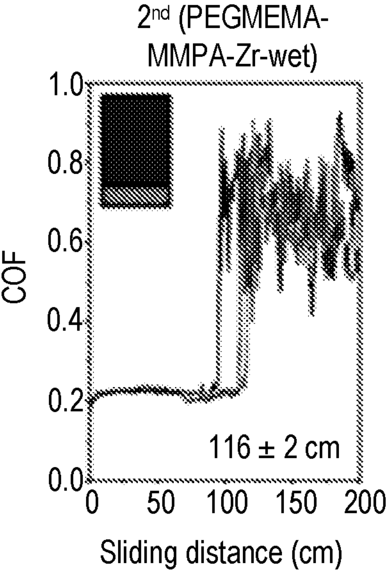
Figure 22:
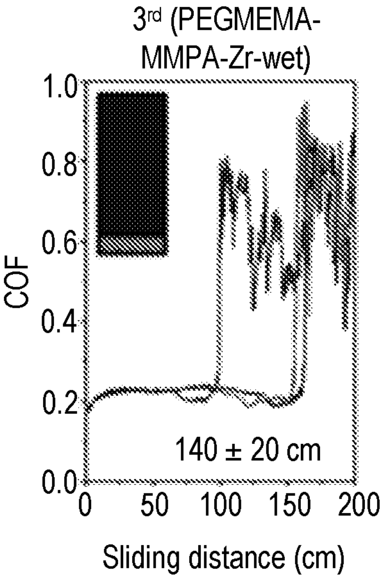

A layered structure can be achieved by repeating the spin coating and crosslinking step several times. Copolymer 3h was spin-coated onto an aluminum oxide coated silicon wafer and subsequently crosslinked by incubation in 5 mM zirconium bis(acetylacetonate) solution in ethanol. This two-step procedure were repeated up to two more times. In FIG. 22, the nanotribological performance applying a force of 300 mN normal load is demonstrated after one (second panel from the left), two (third panel from the left), and three (right-most panel) applications.

All patents, patent applications, publications, and abstracts cited above are incorporated herein by reference in their entirety. Reference has been made in detail to various embodiments of the disclosed subject matter, one or more examples of which were set forth above. Each example was provided by way of explanation of the subject matter, not limitation thereof. In fact, it will be apparent to those skilled in the art that various modifications and variations may be made in the present subject matter without departing from the scope or spirit of the disclosure. For instance, features illustrated or described as part of one example, may be used with another example to yield a still further example.

What is claimed is:

1. A graft copolymer pretreatment composition, comprising:

a polymer backbone;

at least one surface binding or bonding moiety attached to the polymer backbone and configured to bind or bond the polymer backbone to a first surface of a metal product;

at least one functional moiety attached to the polymer backbone which comprises a polymer side chain that provides a lubricating function and configured to provide at least a first surface functionalization to the first surface of the metal product; and at least one second functional moiety attached to the polymer backbone and configured to provide at least a second surface functionalization to the first surface of the metal product, wherein the at least one functional moiety and the at least one second functional moiety provide a multi-functional surface coating.

2. The graft copolymer pretreatment composition of claim 1, wherein the polymer backbone comprises an acrylic class chain polymer structure, a methacrylic class chain polymer structure, a vinyl class chain polymer structure, a diene class chain polymer structure, a vinylidene class chain polymer structure, or any combination thereof.

3. The graft copolymer pretreatment composition of claim 1, wherein the polymer backbone is poly(methyl methacrylate), poly(ethyl methacrylate), poly(ethyl acrylate), polyacrylonitrile, polyethylene, polypropylene, polystyrene, poly(vinyl chloride), poly(vinyl acetate), poly(vinyl alcohol), polybutadiene, polyisoprene, polychloroprene, or any combination thereof.

4. The graft copolymer pretreatment composition of any claim 1, wherein the at least one surface binding or bonding moiety comprises a phosphonate group, a carboxyl group, a catechol group, or a trialkoxysilyl group.

5. A method of pretreating at least a portion of a metal surface, comprising:

applying the graft copolymer pretreatment composition of claim 1 to at least the portion of the metal surface.

6. The method of claim 5, wherein the applying the graft copolymer pretreatment composition comprises solution coating at least the portion of the metal surface.

7. The method of claim 6, wherein the solution coating comprises roll-coating, immersion coating, enrobing, spin-coating, or spray coating at least the portion of the metal surface.

8. The graft copolymer pretreatment composition of claim 1, wherein the at least one surface binding or bonding moiety attached to the polymer backbone is a phosphonate group.

9. The graft copolymer pretreatment composition of claim 1, wherein the at least one surface binding or bonding moiety attached to the polymer backbone is phosphoric acid.

10. The graft copolymer pretreatment composition of claim 1, wherein the at least one surface binding or bonding moiety attached to the polymer backbone is phosphonic acid.

11. The graft copolymer pretreatment composition of claim 1, wherein the polymer side chain that provides a lubricating function is polyethylene glycol.

12. The graft copolymer pretreatment composition of claim 11, wherein the poly(ethylene glycol) has a number average molecular weight ($M_n$) from 300 to 5000.

13. The graft copolymer pretreatment composition of claim 1, wherein the polymer side chain that provides a lubricating function is polysilicone.

14. The graft copolymer pretreatment composition of claim 1, wherein the polymer backbone is poly(methacrylate).

15. The graft copolymer pretreatment composition of claim 1, wherein the polymer backbone is poly(methyl methacrylate).

16. The graft copolymer pretreatment composition of claim 1, wherein the metal product comprises an aluminum alloy.

17. The graft copolymer pretreatment composition of claim 1, wherein the at least one second functional moiety comprises an adhesion promoter, a polymer side chain that provides a lubricating function, a humectant, a weld promoter, or a corrosion inhibitor.

18. The method of claim 5, wherein the metal surface comprises an aluminum alloy.

* * * * *